United States Patent
Amerga et al.

(10) Patent No.: US 9,001,737 B2
(45) Date of Patent: Apr. 7, 2015

(54) EMBMS SERVICE ACTIVATION AND MAINTENANCE PROCEDURE IN MULTI-FREQUENCY NETWORKS

(71) Applicant: QUALCOMM Incorporated, San Diego, CA (US)

(72) Inventors: Daniel Amerga, San Diego, CA (US); Udayan Murli Bhawnani, San Diego, CA (US); Kuo-Chun Lee, San Diego, CA (US); Shailesh Maheshwari, San Diego, CA (US); Nagaraju Naik, San Diego, CA (US); Ketan Narendra Patel, Santa Clara, CA (US); Jack S. Shauh, San Diego, CA (US); Sivaramakrishna Veerepalli, San Diego, CA (US); Gordon Kent Walker, Poway, CA (US); Jun Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 13/773,489

(22) Filed: Feb. 21, 2013

(65) Prior Publication Data
US 2013/0258934 A1 Oct. 3, 2013

Related U.S. Application Data

(60) Provisional application No. 61/617,453, filed on Mar. 29, 2012.

(51) Int. Cl.
*H04W 4/00* (2009.01)
*H04W 4/06* (2009.01)
(Continued)

(52) U.S. Cl.
CPC .............. *H04W 4/06* (2013.01); *H04W 72/00* (2013.01); *H04W 48/16* (2013.01); *H04W 48/20* (2013.01)

(58) Field of Classification Search
None
See application file for complete search history.

(56) References Cited

U.S. PATENT DOCUMENTS

| 6,549,524 B1 | 4/2003 | Shin |
| 7,801,480 B2 | 9/2010 | Becker |

(Continued)

FOREIGN PATENT DOCUMENTS

| EP | 1478198 A1 | 11/2004 |
| EP | 1509056 A2 | 2/2005 |

(Continued)

OTHER PUBLICATIONS

International Search Report and Written Opinion—PCT/US2013/027487—ISA/EPO—Sep. 16, 2013 (121852WO).

(Continued)

*Primary Examiner* — Brian Roberts
(74) *Attorney, Agent, or Firm* — Arent Fox LLP

(57) ABSTRACT

A method, an apparatus, and a computer program product for wireless communication are provided. The apparatus receives a user service description (USD) message. When a frequency indicated in the USD message is not a current frequency, the apparatus determines that a system information message is received, determines that the frequency indicated in the USD message is included in the system information message, determines that the frequency is a neighboring cell frequency, sets a priority of the frequency to a highest priority, and measures a signal strength of the frequency when the frequency is included in the system information message, performs a cell reselection determination procedure based on the signal strength of the frequency, performs cell reselection to the neighboring cell based on a result of the cell reselection determination procedure, and acquires the multicast service in the neighboring cell on the frequency.

58 Claims, 13 Drawing Sheets

(51) Int. Cl.
*H04W 48/20* (2009.01)
*H04W 72/00* (2009.01)
*H04W 48/16* (2009.01)

(56) References Cited

U.S. PATENT DOCUMENTS

| | | | |
|---|---|---|---|
| 8,050,679 B2 * | 11/2011 | Kwak et al. | 455/436 |
| 8,121,602 B2 | 2/2012 | Yi et al. | |
| 8,280,377 B2 | 10/2012 | Lee et al. | |
| 2005/0147127 A1 * | 7/2005 | Putcha et al. | 370/480 |
| 2008/0112367 A1 | 5/2008 | Kuo | |
| 2008/0207131 A1 | 8/2008 | Coersmeier | |
| 2008/0207211 A1 | 8/2008 | Kwak et al. | |
| 2008/0298294 A1 | 12/2008 | Gonsa et al. | |
| 2009/0122740 A1 | 5/2009 | Bouazizi | |
| 2010/0029274 A1 | 2/2010 | Deshpande et al. | |
| 2010/0144275 A1 | 6/2010 | Satou | |
| 2011/0134099 A1 | 6/2011 | Tsubata | |
| 2011/0170496 A1 | 7/2011 | Fong et al. | |
| 2011/0190029 A1 | 8/2011 | Paerssinen et al. | |
| 2011/0222401 A1 | 9/2011 | Kyeong-In et al. | |
| 2012/0236776 A1 | 9/2012 | Zhang et al. | |
| 2013/0044670 A1 * | 2/2013 | Jang et al. | 370/312 |
| 2013/0114405 A1 * | 5/2013 | Kim et al. | 370/230 |
| 2013/0194996 A1 * | 8/2013 | Oyman | 370/312 |
| 2013/0242738 A1 * | 9/2013 | Chang | 370/235 |

FOREIGN PATENT DOCUMENTS

| | | |
|---|---|---|
| EP | 1638359 A1 | 3/2006 |
| EP | 1675425 A2 | 6/2006 |
| GB | 2337426 A | 11/1999 |
| GB | 2392346 A | 2/2004 |
| WO | 2009053879 A1 | 4/2009 |

OTHER PUBLICATIONS

Partial International Search Report—PCT/US2013/027487—ISA/EPO—Jun. 5, 2013 (121852WO).

* cited by examiner

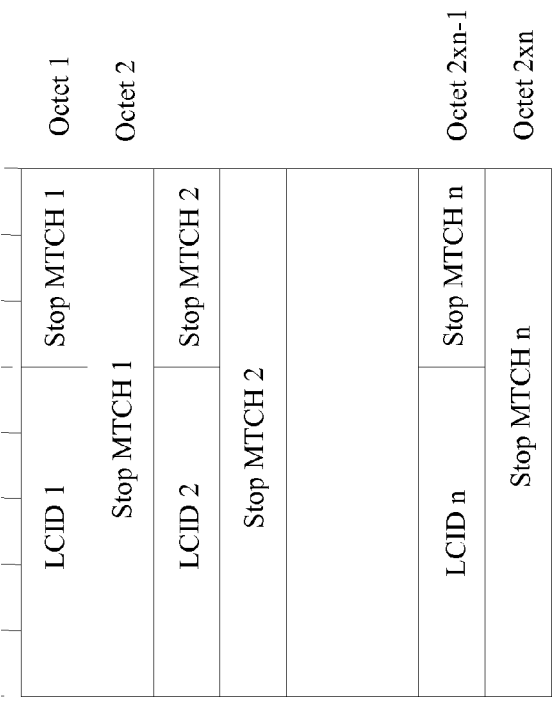
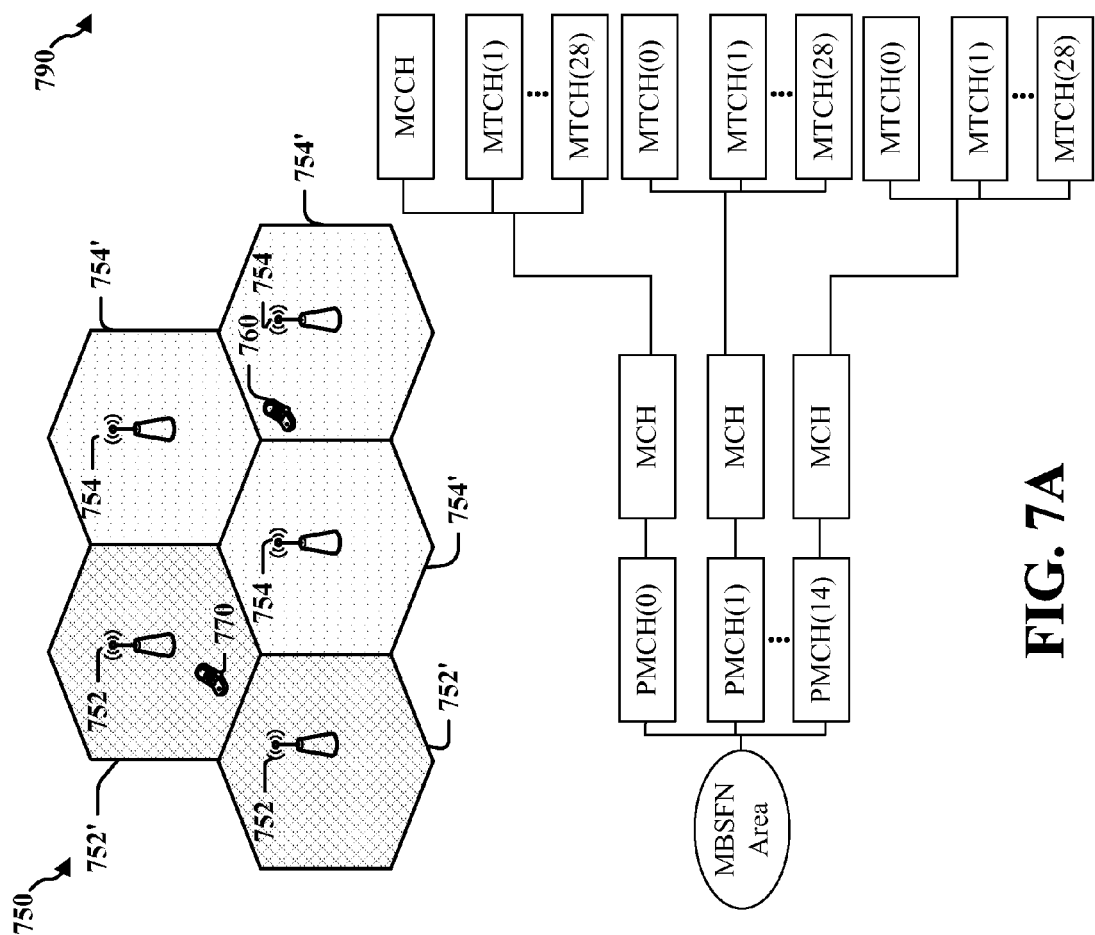
FIG. 7B
FIG. 7A

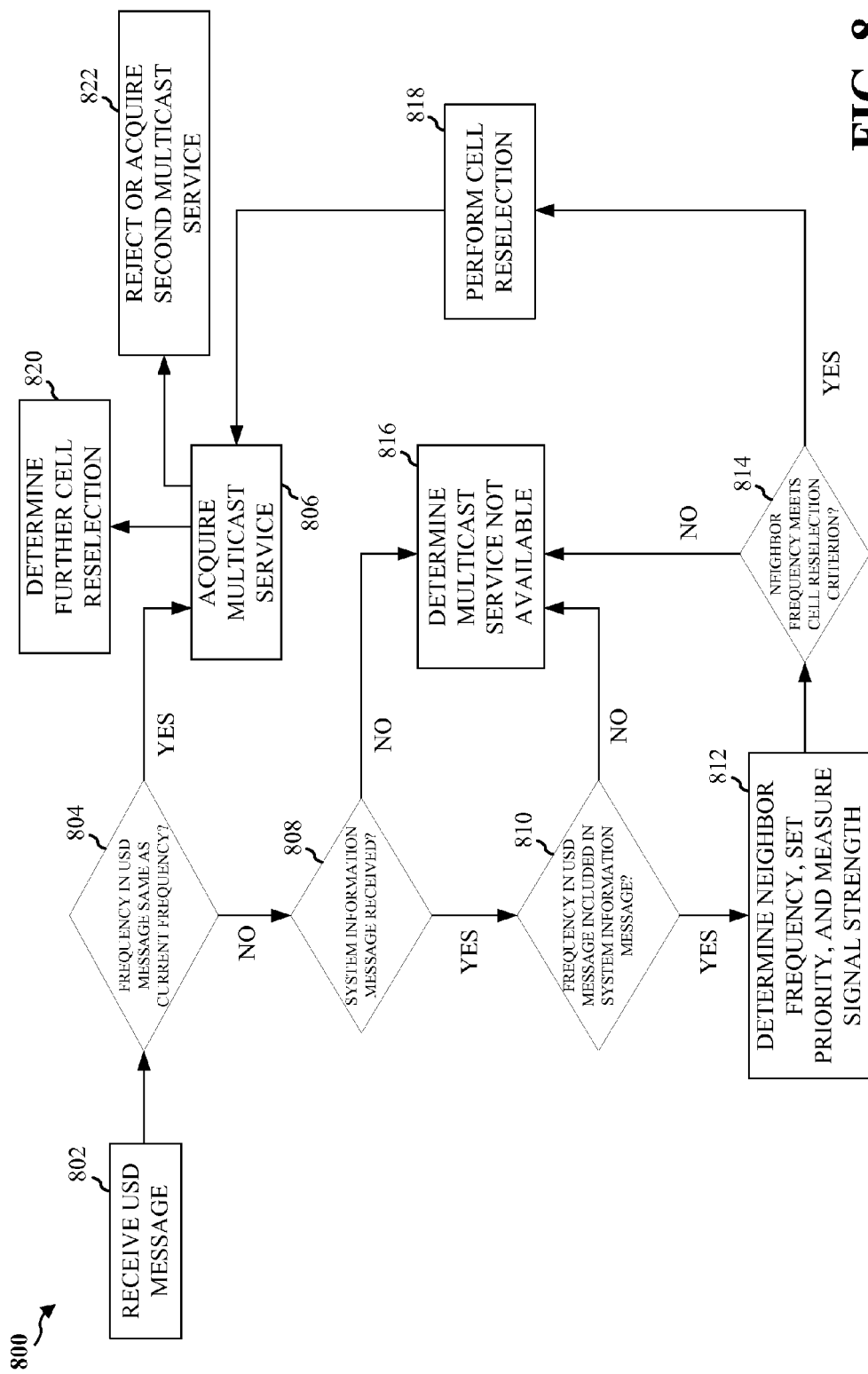

EMBMS SERVICE ACTIVATION AND MAINTENANCE PROCEDURE IN MULTI-FREQUENCY NETWORKS

CROSS-REFERENCE TO RELATED APPLICATION(S)

This application claims the benefit of U.S. Provisional Application Ser. No. 61/617,453, entitled "EMBMS SERVICE ACTIVATION AND MAINTENANCE PROCEDURE IN MULTI-FREQUENCY NETWORKS" and filed on Mar. 29, 2012, which is expressly incorporated by reference herein in its entirety.

BACKGROUND

1. Field

The present disclosure relates generally to communication systems, and more particularly, to searching and acquiring a multicast service in a network having multiple frequencies.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, an apparatus, and a computer program product for wireless communication are provided. Particularly, the disclosure provides for acquiring a multicast service by a user equipment (UE). The apparatus includes receiving a user service description (USD) message, the USD message indicating a frequency of a multicast service of interest to the UE, when the frequency indicated in the USD message is not a current frequency, the apparatus determining that a system information message is received, determining that the frequency indicated in the USD message is included in the system information message when the system information message is received, determining that the frequency is a neighboring cell frequency, setting a priority of the neighboring cell frequency to a highest priority, and measuring a signal strength of the neighboring cell frequency when the frequency is included in the system information message, performing a cell reselection determination procedure based on the signal strength of the neighboring cell frequency, performing cell reselection to the neighboring cell based on a result of the cell reselection determination procedure, and acquiring the multicast service in the neighboring cell on the neighboring cell frequency.

In another aspect of the disclosure, the apparatus includes receiving a user service description (USD) message, the USD message indicating a frequency of a multicast service of interest to the UE, acquiring the multicast service when the frequency indicated in the USD message is a current frequency, and determining that the multicast service is not available when the frequency indicated in the USD message is not the current frequency.

In a further aspect of the disclosure, the apparatus includes receiving a user service description (USD) message, the USD message including at least one frequency of a multicast service of interest to the UE, performing a search for other frequencies when the at least one frequency included in the USD message is not a current frequency, the search for other frequencies comprising: determining that a system information message is received, determining frequencies commonly included in the USD message and the system information message when the system information is received, determining that the common frequencies are neighboring cell frequencies, for an i-th common frequency, i=1 to N, wherein N is a total number of common frequencies, and until the multicast service is acquired successfully, the search for other frequencies further comprising: setting a priority of the i-th common frequency to a highest priority, measuring a signal strength of the i-th common frequency, performing a cell reselection determination procedure based on the signal strength of the i-th common frequency, performing cell reselection to a cell of the i-th common frequency based on a result of the cell reselection determination procedure, acquiring the multicast service in the cell of the i-th common frequency when the cell reselection is performed, and determining if the multicast service is acquired successfully, and receiving the multicast service when the multicast service is acquired successfully.

In yet another aspect of the disclosure, the apparatus includes receiving a user service description (USD) message, the USD message including at least one frequency of a multicast service of interest to the UE, acquiring the multicast service when the at least one frequency included in the USD message is a current frequency, determining that the multicast service is not available when the multicast service is not acquired successfully, and determining that the multicast service is not available when the at least one frequency included in the USD message is not the current frequency.

BRIEF DESCRIPTION OF THE DRAWINGS

FIG. 7A is a diagram illustrating evolved Multimedia Broadcast Multicast Service in a Multicast Broadcast Single Frequency Network.

FIG. 7B is a diagram illustrating a format of a Multicast Channel Scheduling Information Media Access Control Control Element.

FIG. 8 is a flow chart of a method of wireless communication.

DETAILED DESCRIPTION

Figure 1:
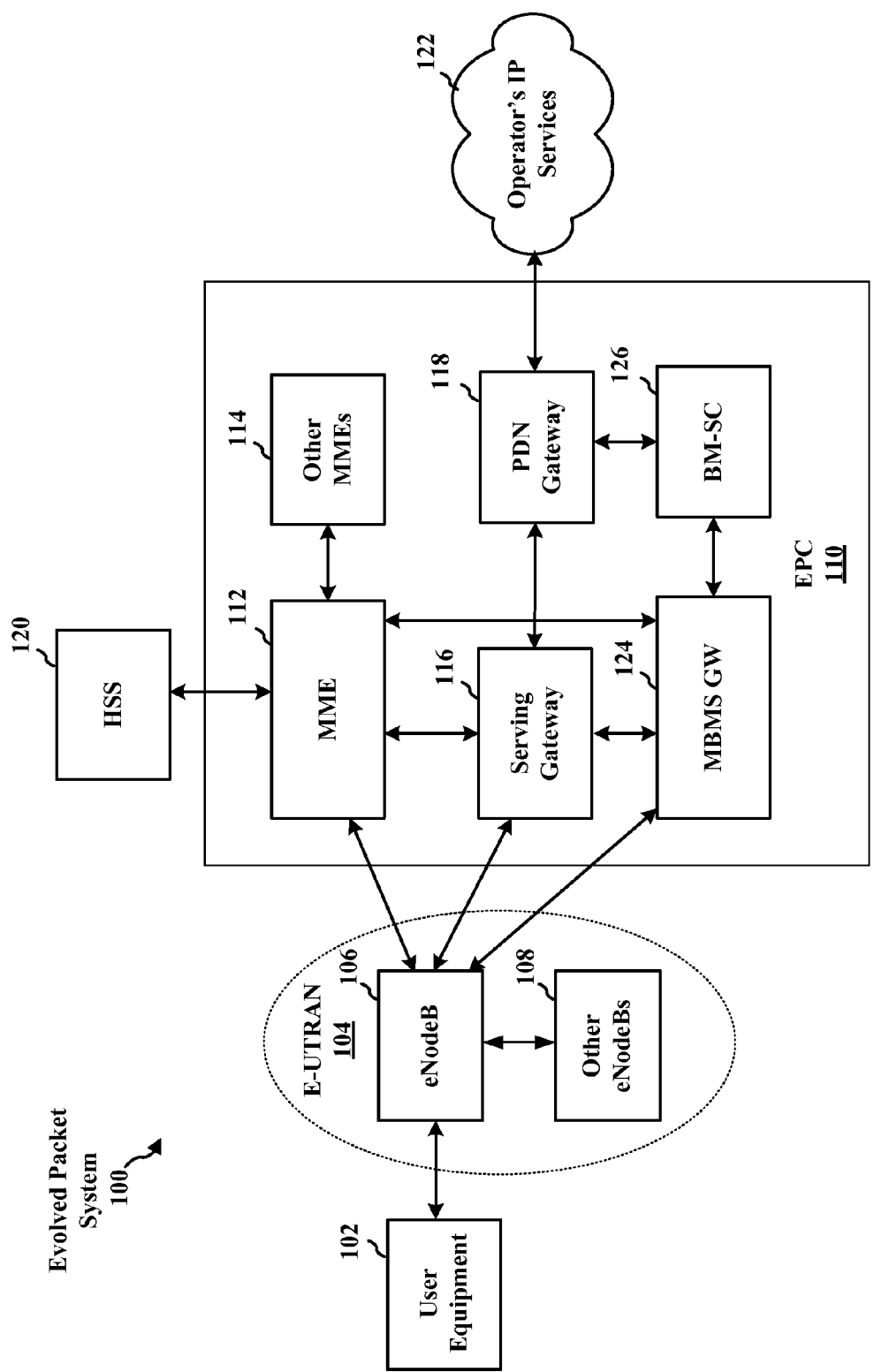
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108.

The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
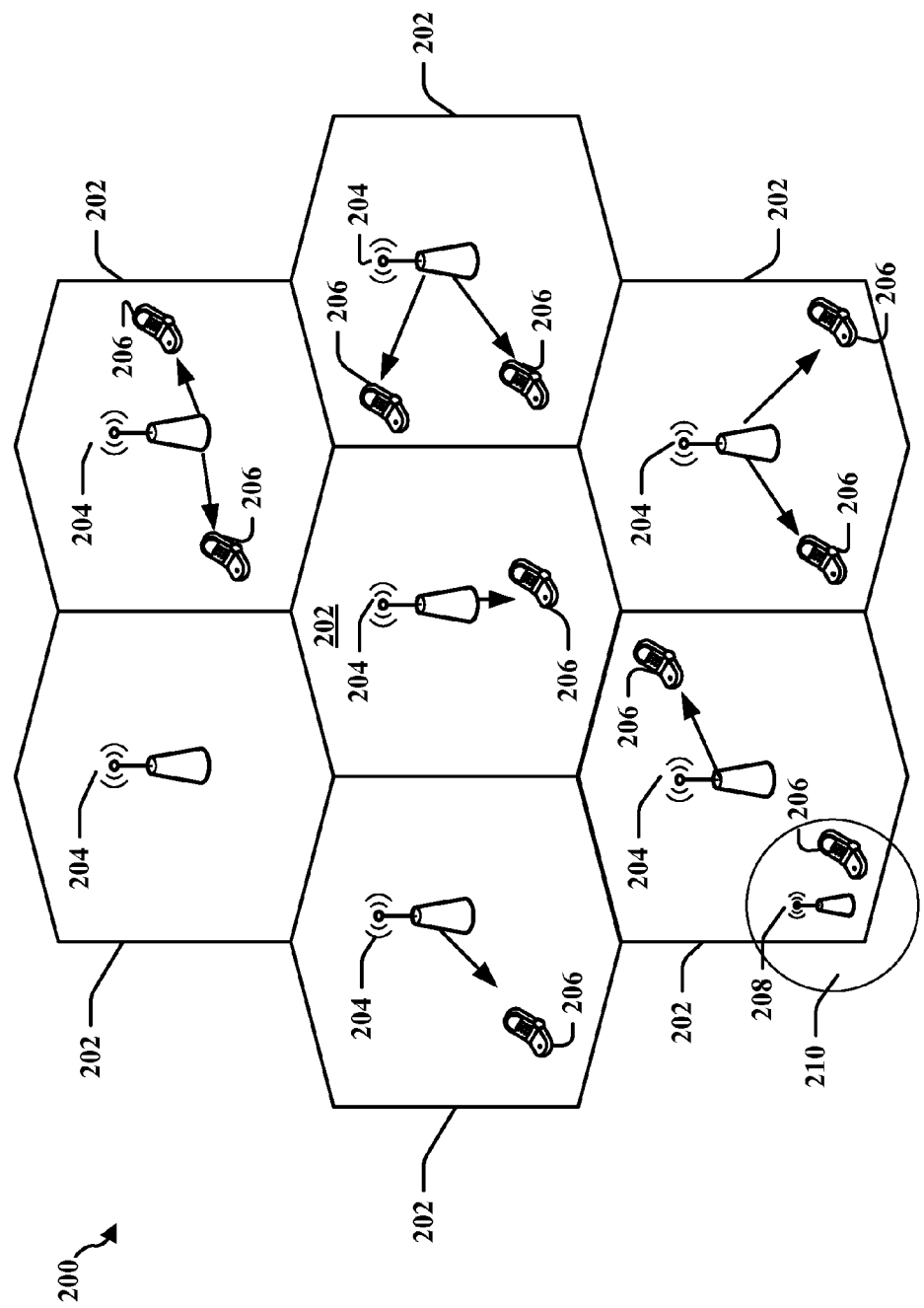
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
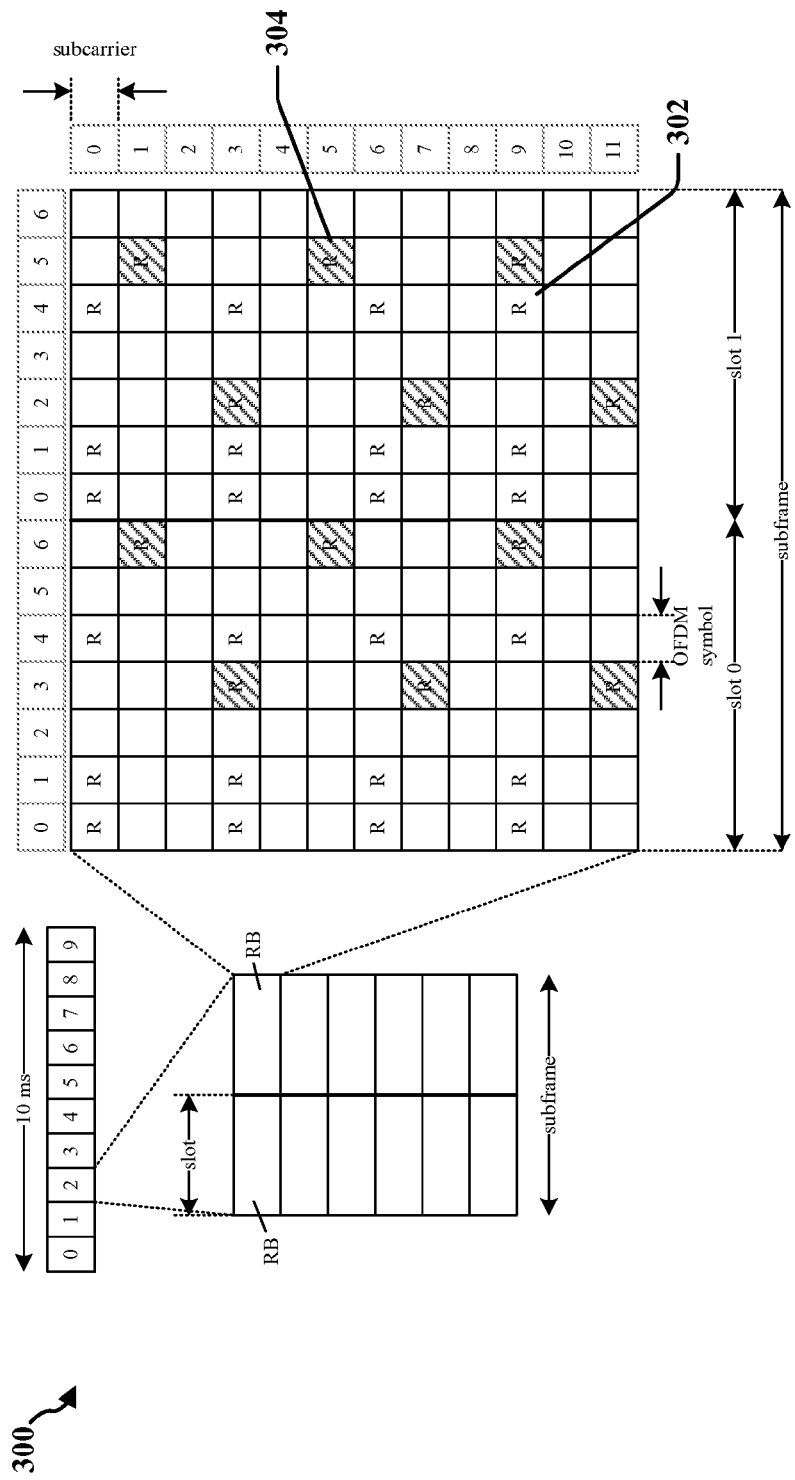
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
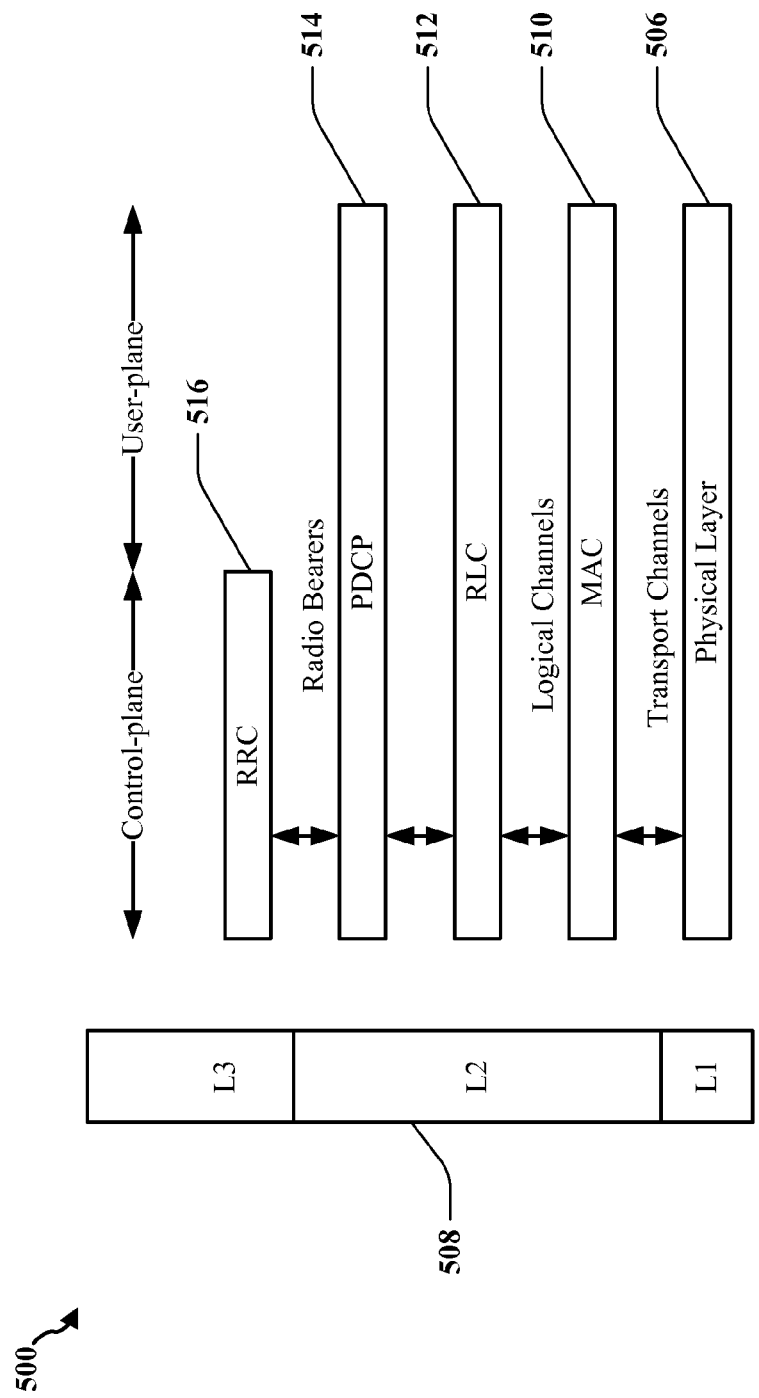
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
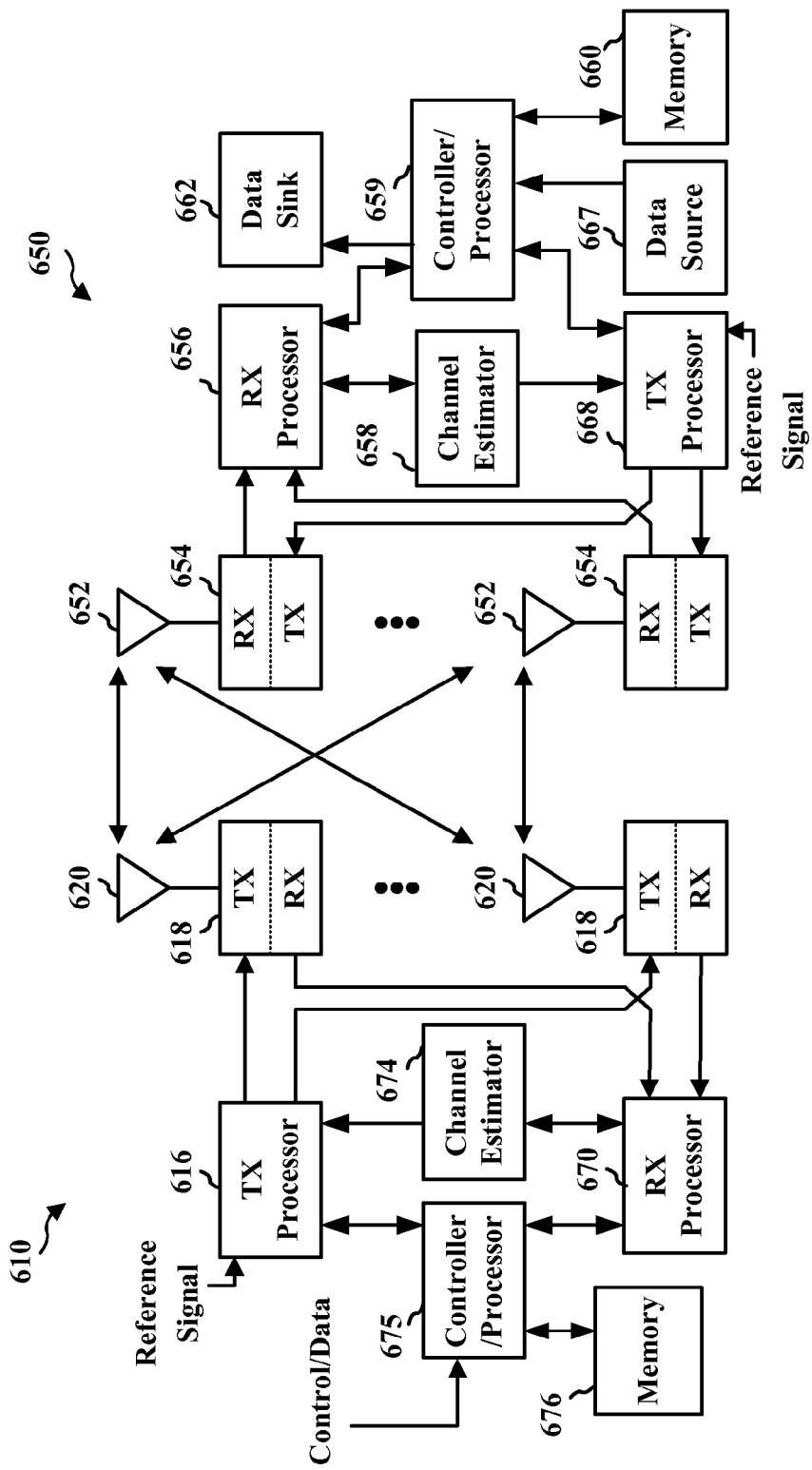
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

FIG. 7A is a diagram 750 illustrating evolved MBMS (eMBMS) in a Multicast Broadcast Single Frequency Network (MBSFN). The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE acquires a system information block (SIB) 13 (SIB13). In a second step, based on the SIB13, the UE acquires an MBSFN Area Configuration message on an MCCH. In a third step, based on the MBSFN Area Configuration message, the UE acquires an MCH scheduling information (MSI) MAC control element. The SIB 13 indicates (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), which subframes of the radio frame as indicated by repetition period and offset can transmit MCCH; and (3) an MCCH change notification configuration. There is one MBSFN Area Configuration message for each MBSFN area. The MBSFN Area Configuration message indicates (1) a temporary mobile group identity (TMGI) and an optional session identifier of each MTCH identified by a logical channel identifier within the PMCH, (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC Control Element is transmitted.

FIG. 7B is a diagram 790 illustrating the format of an MSI MAC Control Element. The MSI MAC Control Element is sent once each MSP. The MSI MAC Control Element is sent in the first subframe of each scheduling period of the PMCH. The MSI MAC Control Element can indicate the stop frame and subframe of each MTCH within the PMCH. There is one MSI per PMCH per MBSFN area.

An RRC protocol supports the transfer of common access stratum (AS) information (i.e., AS information which is applicable to all UEs) as well as dedicated AS information (which is applicable only to a specific UE). For UEs in an RRC idle mode, the RRC supports notification of incoming calls (via paging). The RRC protocol may handle the broadcast of system information, which includes AS common information. Some of the system information is applicable only for UEs in the RRC idle mode while other system information is also applicable for UEs in an RRC connected mode.

System information is structured by means of System Information Blocks (SIBs), each of which contains a set of functionally-related parameters. In an aspect of the disclosure, System Information Block Type 3 (SIB3) and System Information Block Type 5 (SIB5) will be discussed, which include parameters used to control intra-frequency, inter-frequency, and inter-radio access technology (RAT) cell reselection.

Tables 1 and 2 below list parameters for inter-frequency cell reselection in accordance with an aspect of the disclosure. Inter-frequency cell reselection relates to a procedure performed by a UE for selecting a better frequency. Table 1 lists parameters of SIB5, which may be used to define serving cell frequency parameters. Table 2 lists parameters of SIB5, which may be used to define neighboring cell frequency parameters.

Referring to Tables 1 and 2, at least one of the parameters of SIB3 and SIB5 may be configured to better perform inter-frequency cell reselection. For example, values of the following parameters may be lowered: 1) threshServingLowQ-r9; 2) threshX-HighQ-r9; and 3) t-ReselectionEUTRA. Moreover, a value of the following parameter may be set higher: 1) threshX-LowQ-r9. Additionally, the cellReselectionPriority parameter may have a value, e.g., 7, reserved for indicating an

TABLE 1

| SIB3 | | |
| --- | --- | --- |
| Parameter | Description | eMBMS Preferred Configuration |
| s-NonIntraSearchP-r9 | Power threshold when both power and quality of serving cell is good to not perform inter-frequency measurement | Needed to avoid inter-frequency measurement which may disrupt eMBMS service |
| s-NonIntraSearchQ-r9 | Quality threshold when both power and quality of serving cell is good to not perform inter-frequency measurement | Needed to avoid inter-frequency measurement which may disrupt eMBMS service |
| threshServingLow | When serving frequency power is lower than this threshold and neighbor frequency is higher, then reselect to lower priority frequency (if threshServingLowQ-r9 is provided, then this is not used) | Not needed for LTE R9, assuming threshServingLowQ-r9 is provided; otherwise, set to higher value |
| threshServingLowQ-r9 | When serving frequency quality is lower than this threshold and neighbor frequency is higher, then reselect to lower priority frequency | Set to lower value to avoid reselect to another frequency when already receiving eMBMS |
| cellReselectionPriority | Priority of serving cell | Can set serving and neighbor frequencies as the same priority but reserve highest priority value for eMBMS |

TABLE 2

| SIB5 | | |
| --- | --- | --- |
| Parameter | Description | eMBMS Preferred Configuration |
| t-ReselectionEUTRA | Hysteresis timer to check threshold before cell reselection | Set to lower value to quickly cell reselect due to eMBMS service on another frequency |
| threshX-High | When neighbor frequency power is higher than this threshold, then reselect to higher priority frequency (if threshServingLowQ-r9 is provided, then this is not used) | Not needed for LTE, assuming threshServingLowQ-r9 is provided; otherwise, set to lower value |
| threshX-Low | When neighbor frequency power is higher than this threshold and serving frequency is lower, then reselect to lower priority frequency (if threshServingLowQ-r9 is provided, then this is not used) | Not needed for LTE, assuming threshServingLowQ-r9 is provided; otherwise, set to higher value |
| cellReselectionPriority | Priority of neighbor frequency | Can set serving and neighbor frequencies as the same priority but reserve highest priority value for eMBMS |
| q-OffsetFreq | Offset in neighbor frequency signal to compare between equal priority frequencies | Can be used to prevent inter-frequency cell reselection among same priority |
| threshX-HighQ-r9 | When neighbor frequency quality is higher than this threshold, then reselect to higher priority frequency | Set to lower value to allow reselect to another frequency for eMBMS |
| threshX-LowQ-r9 | When neighbor frequency quality is higher than this threshold and serving frequency is lower, then reselect to lower priority frequency | Set to higher value to avoid reselect to another frequency when already receiving eMBMS | eMBMS service with the highest priority. Other values (e.g., 0, 1, 2, 3, 4, 5, and 6) in SIB5 may be used for normal cell reselection.

In an aspect of the disclosure, a method is provided for searching and acquiring an eMBMS service in a network having multiple frequencies. Multiple frequencies that may carry eMBMS services is a new problem. For example, in a multi-frequency deployment, the UE may unnecessarily search for an eMBMS service across several frequencies. This may disrupt reception of a unicast service, such as when the UE receives paging, data, etc. Accordingly, the disclosure considers both a unicast service and an eMBMS service in an integral handling procedure in a multi-frequency deployment. Particularly, the disclosure provides for the UE to utilize information included in a received system information message to mitigate a number of frequencies the UE evaluates when searching for the eMBMS service in the multi-frequency deployment. The disclosure also provides for supporting a legacy UE to be forward-compatible with the multi-frequency deployment.

A frequency may be assigned a priority level (e.g., 0, 1, ..., 7), wherein a higher value of the priority level means a higher priority. If a neighbor frequency has a priority lower than a serving frequency, then the UE may reselect to the neighbor frequency if: 1) serving cell signal is lower than threshServing-Low (or threshServing-LowQ); 2) neighbor frequency cell signal is greater than threshX-Low (or threshX-LowQ) for t-Reselection seconds; and 3) the UE is camped on the serving cell for at least one second.

If the neighbor frequency has a priority higher than the serving frequency, then the UE reselects to the neighbor frequency if: 1) neighbor frequency cell signal is greater than threshX-High (or threshX-HighQ) for t-Reselection seconds; and 2) the UE is camped on the serving cell for at least one second.

The signals discussed above may be measured according to signal strength (e.g., reference signal received power (RSRP)), or signal quality (e.g., reference signal received quality (RSRQ)), dependent on whether SIB3 includes threshServing-LowQ which triggers use of RSRQ.

With respect to LTE Release 9, eMBMS may be prioritized in inter-frequency cell reselection. Particularly, if the UE has knowledge of which frequency an eMBMS service of interest is provided, the UE may consider that frequency to have the highest priority during an eMBMS session.

To receive an eMBMS service broadcast on MTCH, the UE generally completes a service announcement procedure in which a User Service Description (USD) is received. In the USD, a service identified by a temporary mobile group identifier (TMGI) may be further associated with protocol parameters (e.g., IP address, UDP port, FLUTE TSI, etc.) for receiving the service.

In particular, to receive a particular eMBMS service a user may utilize a UE application, such as an electronic program guide (EPG), to select content. The EPG maps pieces of content to a service identity (ID). A user interface (UI) may retrieve the service ID from the EPG and pass the service ID to the UE. The USD received by the UE may include protocol configuration information for receiving eMBMS services. Each eMBMS service configuration is identified by the service ID and specifies the configuration, such as a temporary mobile group identity (TMGI), frequency information, etc. Therefore, when the UE receives a command from the UI to receive a particular eMBMS service as identified by the service ID, the UE may use the USD to retrieve the TMGI of the service. The TMGI is used in an LTE protocol to identify a particular eMBMS service and is globally unique at a given time.

In LTE Release 9, the frequency information of the USD may include a list of frequencies of each eMBMS service, identified by the TMGI, on which the network can send the eMBMS service. Therefore, the UE may use the USD to learn of the frequencies to acquire for the eMBMS service.

With respect to LTE Release 11, the USD may include frequency and service area identity (ID) information in which a TMGI can have multiple frequency and service area ID entries. Accordingly, the UE may use a current cell's service area ID to learn of a corresponding frequency, and acquire service on that frequency.

In particular, in LTE Release 11, the frequency information of the USD may include the frequency of each service area ID (SAI) of each eMBMS service being identified by the TMGI. The SAI may identify a group of cells broadcasting an eMBMS service and can be used for identifying the frequency of the group of cells broadcasting the eMBMS service. The SAI may also be signaled in the system information of each cell. When an LTE Release 11 UE is in an LTE Release 11 network, the UE can use the system information to learn of a current SAI and use the current SAI to filter the frequency. However, a legacy UE such as an LTE Release 9 UE, cannot process the SAI. Therefore, the legacy UE will ignore the SAI and use all the frequencies of the corresponding TMGI in the USD, to acquire for the eMBMS service.

SIB5 may indicate neighbor frequencies and associated configuration information for inter-frequency cell reselection in idle mode.

In an aspect, the disclosure considers a scenario where a legacy UE (e.g., LTE Release 9 UE) is operating in a LTE Release 11 network. In such a scenario, the Release 9 UE will ignore the service area ID included in the Release 11 USD because it is not configured to read such information in the USD. Accordingly, the Release 9 UE may search through multiple frequencies associated with a TMGI identifying the eMBMS service, although only one frequency may carry the eMBMS service of interest. The disclosure further considers the UE in both idle and connected modes.

In an aspect, the disclosure provides a method for acquiring eMBMS in idle mode for a LTE Release 9 network configuration. In such a network configuration, the USD may indicate a frequency corresponding to an eMBMS service of interest to the UE, wherein the frequency is different from a serving frequency. The method includes determining if the frequency indicated in the USD is also included in a received SIB5, wherein SIB5 indicates neighbor frequencies. When the frequency is included in the USD and SIB5, then the frequency may be a neighbor frequency, and the UE prepares for cell reselection to the neighbor frequency.

Preparing for cell reselection includes setting a priority of the neighbor frequency to a highest priority and measuring a signal strength of the neighbor frequency. If the signal strength of the neighbor frequency meets a cell reselection criterion, then the UE performs cell reselection to the neighbor cell corresponding to the neighbor frequency, and acquires the eMBMS service on the neighbor frequency in the neighbor cell. For example, the signal strength of the neighbor frequency may meet the cell reselection criterion when the signal strength of the neighbor cell is greater than threshX-High for t-Reselection seconds, and the UE is camped on the current cell for more than one second. If the cell reselection criterion is not met, then the UE may determine that the eMBMS service of interest is not available. Furthermore, if the frequency indicated in the USD is not included in SIB5, or if a SIB5 is not received, then the UE may determine that the eMBMS service of interest is not available.

In an aspect, the disclosure also provides a method for cell reselection when the UE is already receiving eMBMS in a LTE Release 9 network configuration. In such a network configuration, the UE may avoid inter-frequency cell reselection to minimize disruption of the reception of an existing service. Accordingly, if the UE is already receiving an eMBMS service, the UE may set a priority of a current frequency to a highest priority in inter-frequency cell reselection. The UE may then perform cell reselection when: 1) a signal strength of a serving cell is less than threshServingLow; and 2) a signal strength of a neighbor cell is greater than threshX-Low for t-Reselection seconds and the UE is camped on the serving cell for more than one second. Thereafter, the UE may resume normal priority when a MBMS session is completed (no longer being received).

In an aspect, the disclosure provides a method of receiving a second eMBMS service in idle mode when the UE is currently receiving an eMBMS service in a LTE Release 9 network configuration. If the UE is receiving a first eMBMS service in idle mode and wants to receive a second eMBMS service, various UE options may exist. In a first option, the UE only receives the second eMBMS service when the service is available on the serving frequency, and rejects the second eMBMS service when the service is only available on a different frequency. In a second option, the UE may warn a user that the second eMBMS service cannot be received without deactivating an existing eMBMS service. If the user wants to receive the second eMBMS service on the different frequency, then the existing eMBMS service is deactivated. Here, the UE sets a priority of the neighbor frequency to a highest priority, and when the signal strength of a cell corresponding to the neighbor frequency meets a cell reselection criterion, the UE reselects to the neighbor frequency, and acquires the second eMBMS service.

In an aspect, the disclosure provides a method for acquiring eMBMS in connected mode in a LTE Release 9 network configuration. When an eMBMS service of interest is broadcast on a frequency indicated in the USD that is the same as the current serving frequency, then the UE may acquire the eMBMS service. Otherwise, the UE determines that the eMBMS service of interest is not available. After inter-frequency, inter-RAT handover, a current eMBMS service on a source frequency is released. Since the UE has changed to another frequency, the eMBMS service available on the previous frequency is no longer available, and therefore, the UE will release the service.

In an aspect, the disclosure provides a method for acquiring eMBMS in idle mode in a LTE Release 11 network configuration. In LTE Release 11, the USD may include service area and frequency information. Moreover, the service area information may be signaled via a SIB, although a legacy UE (e.g., a LTE Release 9 UE) may ignore such information since the legacy UE would not be configured to receive this information. The USD may include multiple pairs of frequency and corresponding service area ID.

If the UE determines that the USD includes the current serving frequency, the UE acquires the eMBMS on the serving frequency. If the UE determines that the USD does not include the serving frequency, or if the serving frequency is not associated with a temporary mobile group identifier (TMGI), then the UE proceeds to find a set of frequencies that are common to the USD and SIB5 (e.g., frequencies that are included in both the USD and SIB5). Thereafter, for each common frequency, e.g., in succession until an eMBMS is successfully acquired, the UE: 1) sets a priority of the common frequency to a highest priority; 2) measures a signal strength of the common frequency; 3) performs cell reselection to the common frequency if the common frequency meets a cell reselection criterion; 4) and acquires eMBMS on a cell corresponding to the common frequency. If TMGI is not associated with the common frequency, then the eMBMS is not successfully acquired, and the UE proceeds to perform the above steps for a next common frequency. If no eMBMS is successfully acquired after evaluating each of the common frequencies, the UE may determine that the eMBMS service of interest is not available. Furthermore, if no SIB5 is received by the UE, or if no frequency is commonly included in the SIB5 and the USD, then the UE may determine that the MBMS service of interest is not available.

In an aspect, the disclosure provides a method for acquiring eMBMS in connected mode in a LTE Release 11 network configuration. Here, if the USD includes a current frequency, the UE acquires the eMBMS service on the current frequency. If the eMBMS service is not successfully acquired (e.g., current frequency is not associated with TMGI), then the UE determines that the eMBMS service is not available. Moreover, if the USD does not include the current frequency, the UE determines that the eMBMS service is not available.

FIG. 8 is a flow chart 800 of a method of wireless communication. The method may be for acquiring a multicast service and performed by a UE in idle mode. When in the idle mode, the UE may perform cell selection and reselection, i.e., decide on which cell to camp. At step 802, the UE receives a user service description (USD) message. The USD message includes a frequency of a multicast service of interest to the UE.

At step 804, the UE determines whether the frequency indicated in the USD message is the same as a current frequency the UE is camped on. At step 806, when the frequency indicated in the USD message is the same as the current frequency the UE is camped on, the UE acquires the multicast service on the current frequency.

At step 808, when the frequency indicated in the USD message is not the same as the current frequency the UE is camped on, the UE determines whether a system information message (e.g., SIB5) is received. At step 816, if no system information message is received, the UE determines that the multicast service of interest to the UE is not available.

At step 810, when the system information message is received, the UE determines whether the frequency indicated in the USD message is included in the system information message. If the frequency indicated in the USD message is not included in the system information message, the UE determines that the multicast service of interest to the UE is not available (step 816).

At step 812, when the frequency indicated in the USD message is included in the system information message, the UE proceeds to determine that the frequency is a neighboring cell frequency, set a priority of the neighboring cell frequency to a highest priority, and measure a signal strength of the neighboring cell frequency.

A step 814, the UE determines whether the neighboring cell frequency meets a cell reselection criterion. For example, the cell reselection criterion may be met if: 1) a neighboring cell frequency has the highest priority; 2) a neighboring frequency cell signal is greater than a threshold for a predetermined period of time; and 3) the UE is camped on a current cell for at least one second. Values for the threshold and the predetermined period of time may be included in the system information message (e.g., SIB5).

At step 818, when the cell reselection criterion is met, the UE performs cell reselection to the neighboring cell. When the cell reselection criterion is not met, the UE determines that the multicast service of interest to the UE is not available (step 816). The cell reselection criterion may not be met if: 1) the signal strength of the neighboring cell frequency is not above a threshold; 2) the signal strength of the neighboring cell frequency is not above the threshold for a predetermined period of time; or 3) the UE is not camped on a current cell for at least one second. After performing the cell reselection to the neighboring cell, the UE acquires the multicast service in the neighboring cell on the neighboring cell frequency (step 806).

At step 820, after the multicast service is acquired in the neighboring cell on the neighboring cell frequency, the UE may further determine that the neighboring cell frequency is a new current frequency, set a priority of the new current frequency to a highest priority, and perform cell reselection to a second neighboring cell if a cell reselection criterion is met. Here, the cell reselection criterion is met if: 1) the new current frequency has the highest priority; 2) a signal strength of the new current frequency is less than a second threshold; 3) a signal strength of the second neighboring cell is greater than a third threshold for a predetermined period of time; and 4) the UE is camped on a new current cell for at least one second. A value for the second threshold may be included in a received SIB3 message, and values for the third threshold and the predetermined period of time may be included in a received SIB5 message.

At step 822, after the multicast service is acquired in the neighboring cell on the neighboring cell frequency, the UE may further reject reception of an available second multicast service on a different frequency, or acquire the available second multicast service based on a received acquisition instruction (e.g., user decision). Acquiring the available second multicast service may include the UE deactivating a current multicast service, setting a priority of the different frequency to a highest priority, and performing cell reselection to a cell of the different frequency to acquire the available second multicast service when: 1) the different frequency has the highest priority; 2) a signal strength of the cell of the different frequency is greater than a threshold for a predetermined period of time; and 3) the UE is camped on a current cell for at least one second.

Figure 9:
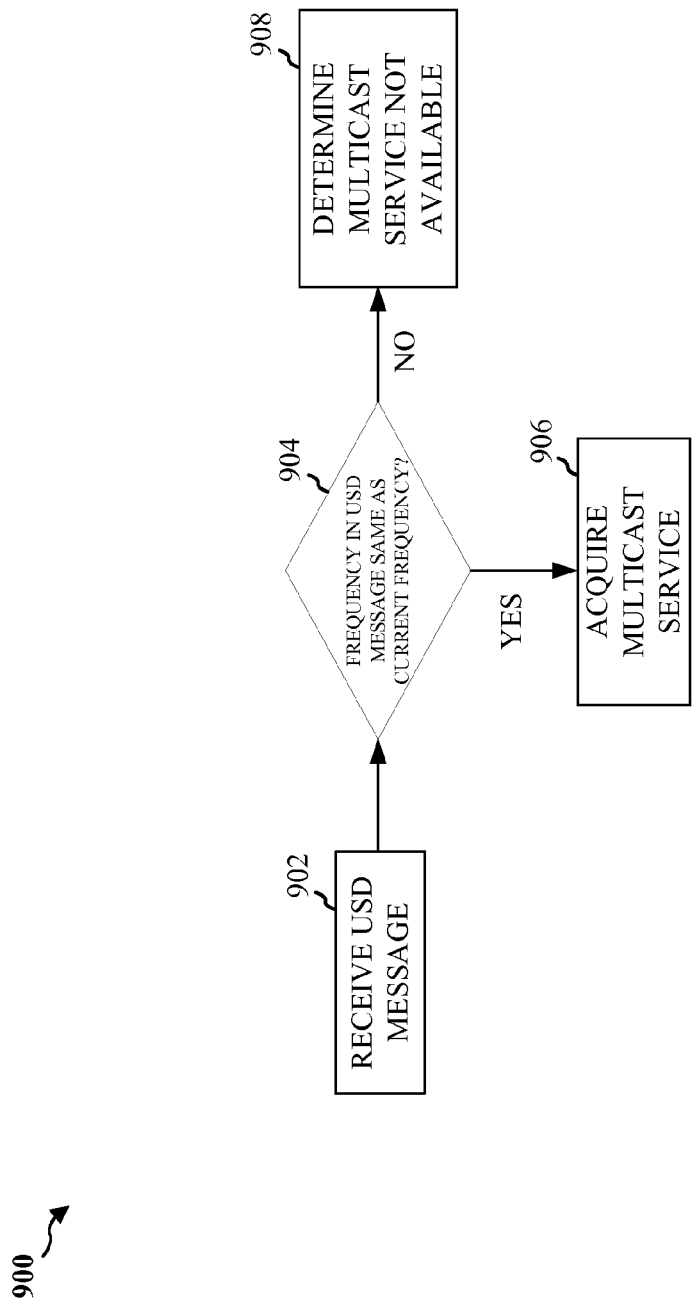
FIG. 9 is a flow chart of a method of wireless communication.

FIG. 9 is a flow chart 900 of a method of wireless communication. The method may be for acquiring a multicast service and performed by a UE in connected mode. When in the connected mode, the UE may receive a unicast service. At step 902, the UE receives a user service description (USD) message. The USD message may indicate a frequency of a multicast service of interest to the UE.

At step 904, the UE determines whether the frequency indicated in the USD message is the same as a current frequency the UE is camped on. At step 906, when the frequency indicated in the USD message is the same as the current frequency the UE is camped on, the UE acquires the multicast service of interest to the UE. At step 908, when the frequency indicated in the USD message is not the same as the current frequency the UE is camped on, the UE determines that the multicast service is not available.

Figure 10:
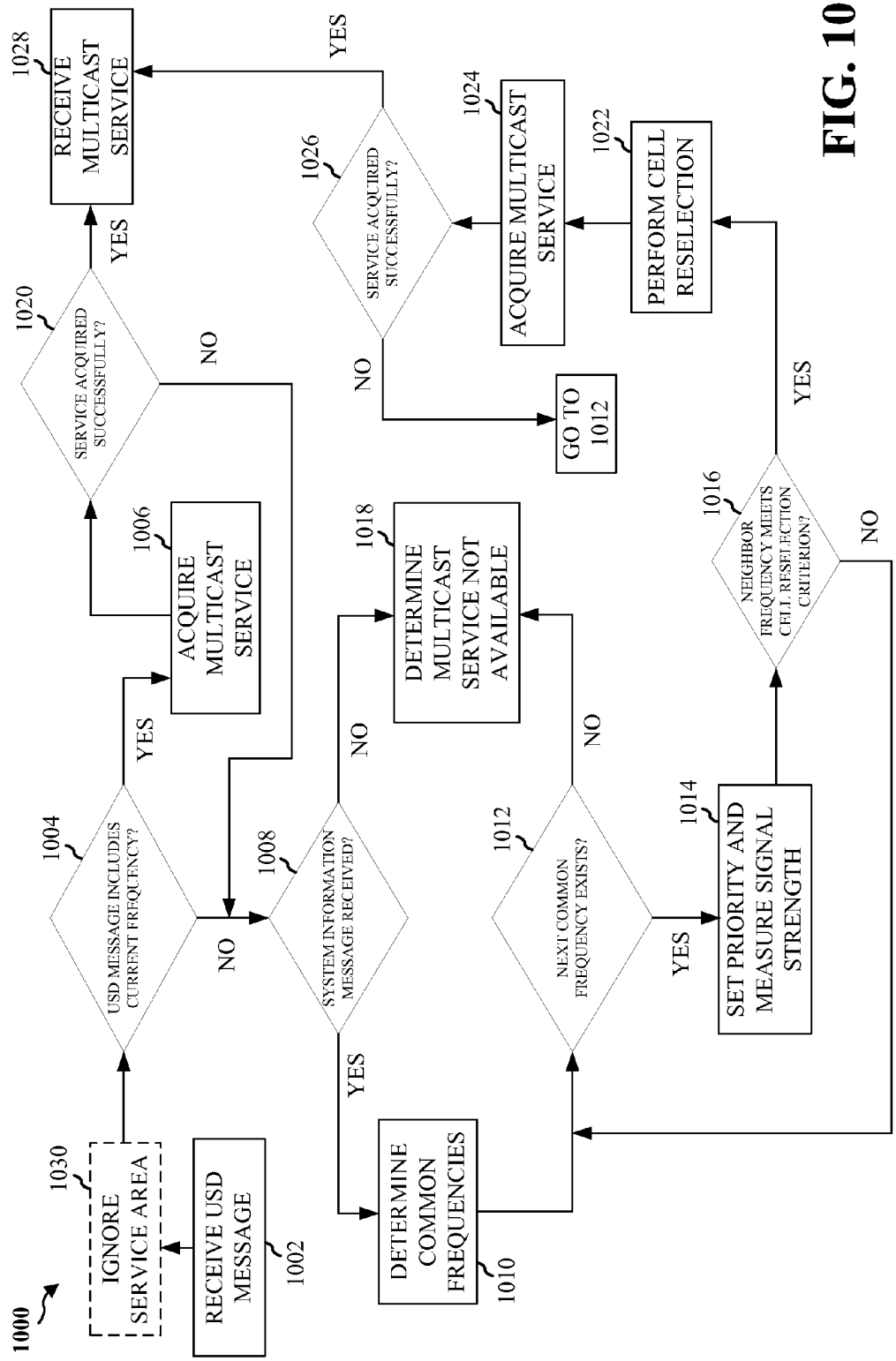
FIG. 10 is a flow chart of a method of wireless communication.

FIG. 10 is a flow chart 1000 of a method of wireless communication. The method may be for acquiring a multicast service and performed by a UE in idle mode. When in the idle mode, the UE may perform cell selection and reselection, i.e., decide on which cell to camp. At step 1002, the UE receives a user service description (USD) message. The UE may receive the USD message upon completing a service announcement procedure with an eNB. The USD message may include at least one frequency of a multicast service of interest to the UE. The USD message may also include service area information corresponding to the at least one frequency of the multicast service of interest to the UE. As such, at step 1030, the UE may ignore the service area information and proceed to search for a frequency to successfully acquire the multicast service without considering the service area information included in the USD message.

At step 1004, the UE determines whether the at least one frequency included in the USD message is a current frequency the UE is camped on. At step 1006, when the at least one frequency included in the USD message is the current frequency the UE is camped on, the UE proceeds to acquire the multicast service.

At step 1020, the UE determines whether the multicast service is acquired successfully. For example, the multicast service is not acquired successfully when the current frequency does not carry a temporary mobile group identifier (TMGI). If the multicast service is acquired successfully, at step 1028, the UE receives the multicast service. When the multicast service is not acquired successfully, the UE proceeds to step 1008 to begin performing a search for other frequencies for acquiring the multicast service.

At step 1008, when the at least one frequency included in the USD message is not the current frequency the UE is camped on, the UE may perform the search for other frequencies to acquire the multicast service. The search for other frequencies may begin with determining whether a system information message (e.g. SIB5) is received. At step 1018, when the system information message is not received, the UE determines that the multicast service is not available.

At step 1010, when the system information message is received, the UE determines which frequencies are commonly included in the USD message and the system information message. The common frequencies found in both the USD message and the system information message may be considered neighboring cell frequencies. The common frequencies may be mapped to an array, wherein each frequency may be assigned a sequential integer number from 1 to N, wherein N equals the number of common frequencies.

At step 1012, the UE begins an operation to sequentially evaluate each of the common frequencies to successfully acquire the multicast service. Until the multicast service is successfully acquired, for an i-th common frequency, wherein i=1 to N, and wherein N is a total number of common frequencies, at step 1014, the UE sets a priority of the i-th common frequency to a highest priority and measures a signal strength of the i-th common frequency.

At step 1016, the UE performs a cell reselection determination procedure based on the signal strength of the i-th common frequency. The cell reselection determination procedure may include determining whether the i-th common frequency meets a cell reselection criterion. For example, the cell reselection criterion may be met if: 1) the i-th common frequency has the highest priority; 2) the signal strength of the i-th common frequency is greater than a threshold for a predetermined period of time; and 3) the UE is camped on the current cell for at least one second. Values for the threshold and the predetermined period of time may be included in the system information message (e.g., SIB5).

When the cell reselection criterion is not met at step 1016, the UE returns to step 1012 to evaluate a next common frequency. For example, evaluating the next common frequency includes incrementing i and again evaluating the i-th common frequency. The cell reselection criterion is not met when: 1) the signal strength of the i-th common frequency is not above a threshold; 2) the signal strength of the i-th common frequency is not above the threshold for a predetermined period of time; or 3) the UE is not camped on the current cell for at least one second. When all common frequencies have been evaluated (e.g., i incremented to a maximum N), and no multicast service is successfully acquired, then the UE determines that the multicast service is not available (step 1018).

At step 1022, when the cell reselection criterion is met, the UE performs cell reselection to a cell of the i-th common frequency. Thereafter, at step 1024 the UE acquires the multicast service in the cell of the i-th common frequency.

At step 1026, the UE determines whether the multicast service is acquired successfully. For example, the multicast service is not acquired successfully when the i-th common frequency does not carry a temporary mobile group identifier (TMGI). The TMGI identifies the multicast service of interest to the UE. Therefore, the UE would not able to receive the multicast service without knowledge of the TMGI. If the multicast service is not acquired successfully, the UE returns to step 1012 to evaluate a next common frequency. Evaluating the next common frequency may include incrementing i by one and again evaluating the i-th common frequency. When all common frequencies have been evaluated (e.g., i has been incremented from one to N), and no multicast service is successfully acquired, then the UE determines that the multicast service is not available (step 1018). At step 1028, the UE receives the multicast service when the multicast service is acquired successfully.

Figure 11:
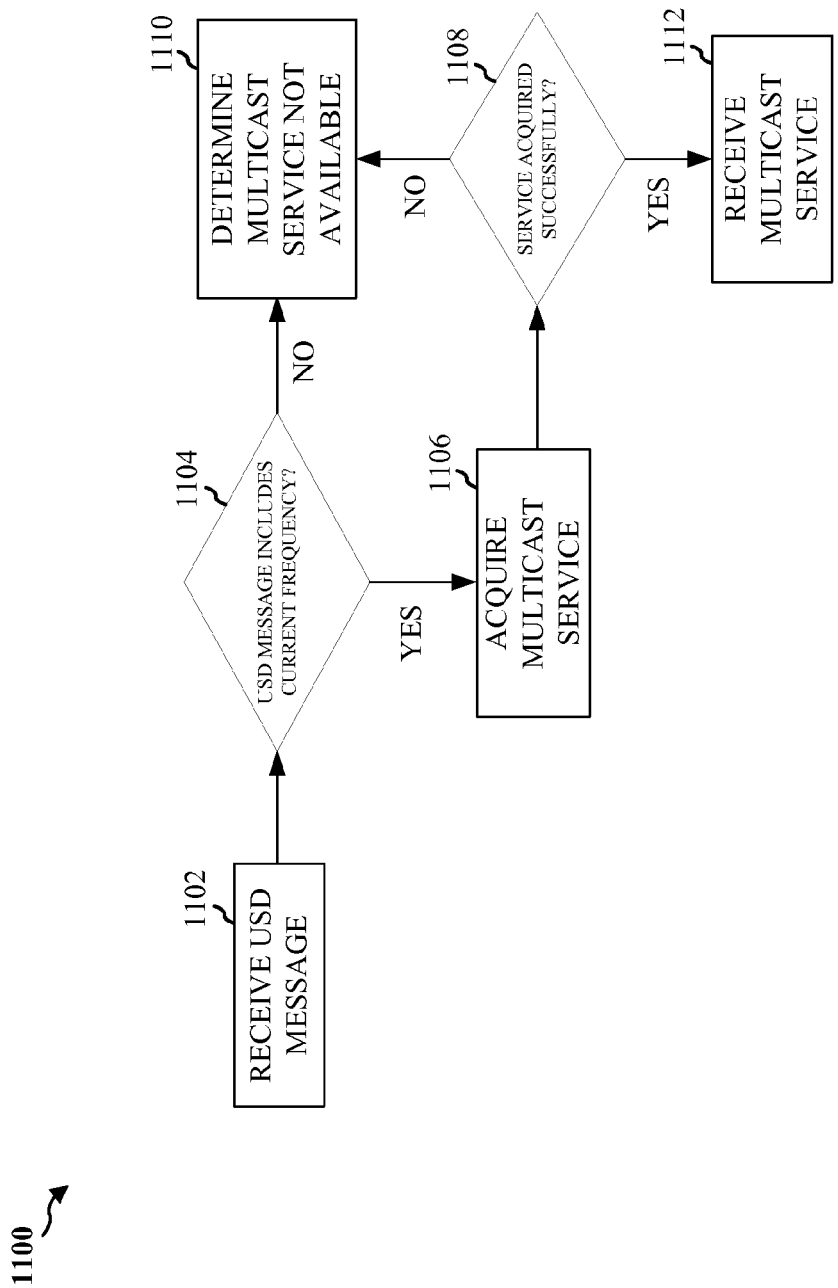
FIG. 11 is a flow chart of a method of wireless communication.

FIG. 11 is a flow chart 1100 of a method of wireless communication. The method may be for acquiring a multicast service and performed by a UE in connected mode. When in the connected mode, the UE may receive a unicast service. At step 1102, the UE receives a user service description (USD) message. The USD message may include at least one frequency of a multicast service of interest to the UE. When the USD message does not include the at least one frequency of the multicast service of interest to the UE, the UE may determine that the multicast service is not available.

At step 1104, the UE determines whether the at least one frequency included in the USD message is a current frequency the UE is camped on. At step 1110, when the at least one frequency included in the USD message is not the current frequency the UE is camped on, the UE determines that the multicast service is not available. At step 1106, when the at least one frequency included in the USD message is the current frequency the UE is camped on, the UE acquires the multicast service.

At step 1108, the UE determines whether the multicast service is acquired successfully. For example, the multicast service is not acquired successfully when the current frequency does not carry a temporary mobile group identifier (TMGI). Accordingly, when the multicast service is not acquired successfully, the UE determines that the multicast service is not available (step 1110). At step 1112, when the multicast service is acquired successfully, the UE receives the multicast service.

Figure 12:
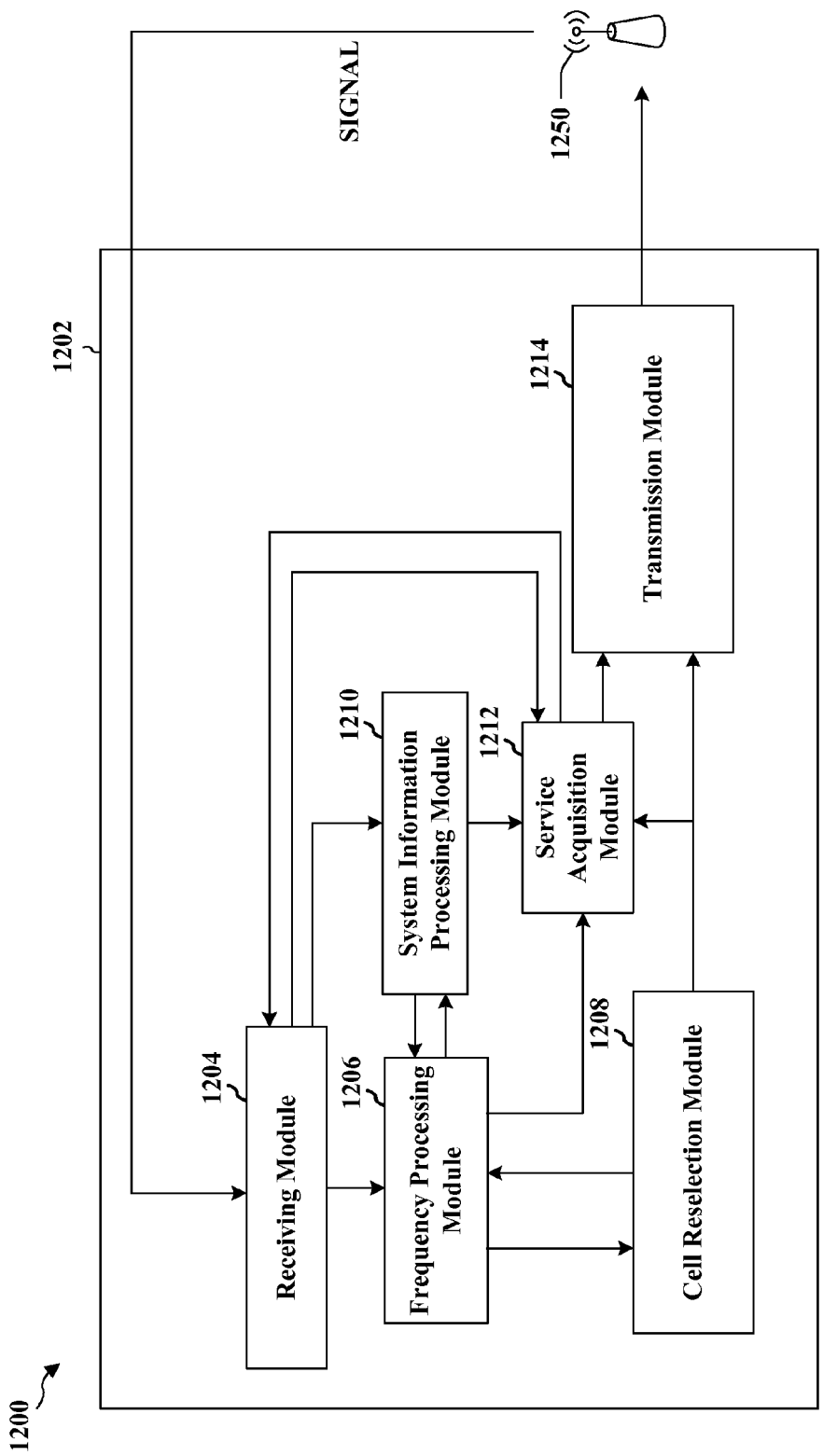
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus includes a receiving module 1204, a frequency processing module 1206, a cell reselection module 1208, a system information processing module 1210, a service acquisition module 1212, and a transmission module 1214.

In an aspect, when the apparatus 1202 is an idle mode, the receiving module 1204 may receive a user service description (USD) message from an eNB 1250. The USD message indicates a frequency of a multicast service of interest to the apparatus 1202. The frequency processing module 1206 determines whether the frequency indicated in the USD message is the same as a current frequency the apparatus 1202 is camped on. When the frequency indicated in the USD message is the same as the current frequency the apparatus 1202 is camped on, the service acquisition module 1212 acquires the multicast service on the current frequency.

When the frequency indicated in the USD message is not the same as the current frequency the apparatus 1202 is camped on, the system information processing module 1210 determines whether a system information message (e.g., SIB5) is received. If no system information message is received, the service acquisition module 1212 determines that the multicast service of interest to the apparatus 1202 is not available.

When the system information message is received, the frequency processing module 1206 determines whether the frequency indicated in the USD message is included in the system information message. If the frequency indicated in the USD message is not included in the system information message, the service acquisition module 1212 determines that the multicast service of interest to the apparatus 1202 is not available.

When the frequency indicated in the USD message is included in the system information message, the cell reselection module 1208 proceeds to determine that the frequency is a neighboring cell frequency, set a priority of the neighboring cell frequency to a highest priority, and measure a signal strength of the neighboring cell frequency.

The cell reselection module 1208 performs a cell reselection determination procedure based on the signal strength of the neighboring cell frequency. The cell reselection determination procedure may include determining whether the neighboring frequency meets a cell reselection criterion. For example, the cell reselection criterion may be met if: 1) a neighboring cell frequency has the highest priority; 2) a neighboring frequency cell signal is greater than a threshold for a predetermined period of time; and 3) the apparatus 1202 is camped on a current cell for at least one second. Values for the threshold and the predetermined period of time may be included in the system information message (e.g., SIB5).

When the cell reselection criterion is met, the cell reselection module 1208 performs cell reselection to the neighboring cell. When the cell reselection criterion is not met, the service acquisition module 1212 determines that the multicast service of interest to the apparatus 1202 is not available. The cell reselection criterion may not be met if: 1) the signal strength of the neighboring cell frequency is not above a threshold; 2) the signal strength of the neighboring cell frequency is not above the threshold for a predetermined period of time; or 3) the apparatus 1202 is not camped on the current cell for at least one second. After performing the cell reselection to the neighboring cell, the service acquisition module 1212 acquires the multicast service in the neighboring cell on the neighboring cell frequency.

After the multicast service is acquired in the neighboring cell on the neighboring cell frequency, the cell reselection module 1208 may further determine that the neighboring cell frequency is a new current frequency, set a priority of the new current frequency to a highest priority, and perform cell reselection to a second neighboring cell if a cell reselection criterion is met. Here, the cell reselection criterion is met if: 1) the new current frequency has the highest priority; 2) a signal strength of the new current frequency is less than a second threshold; 3) a signal strength of the second neighboring cell is greater than a third threshold for a predetermined period of time; and 4) the apparatus 1202 is camped on the new current cell for at least one second. A value for the second threshold may be included in a received SIB3 message, and values for the third threshold and the predetermined period of time may be included in a received SIB5 message.

After the multicast service is acquired in the neighboring cell on the neighboring cell frequency, the service acquisition module 1212 may further reject reception of an available second multicast service on a different frequency, or acquire the available second multicast service based on a received acquisition instruction (e.g., user preference). Acquiring the available second multicast service may include the cell reselection module 1208 deactivating a current multicast service, setting a priority of the different frequency to a highest priority, and performing cell reselection to a cell of the different frequency to acquire the available second multicast service when: 1) the different frequency has the highest priority; 2) a signal strength of the cell of the different frequency is greater than a threshold for a predetermined period of time; and 3) the apparatus 1202 is camped on a current cell for at least one second.

In another aspect of the disclosure, when the apparatus 1202 is in a connected mode, the receiving module 1204 may receive a user service description (USD) message from the eNB 1250 upon completing a service announcement procedure with the eNB 1250. The USD message may indicate a frequency of a multicast service of interest to the apparatus 1202.

The frequency processing module 1206 determines whether the frequency indicated in the USD message is the same as a current frequency the apparatus 1202 is camped on. When the frequency indicated in the USD message is the same as the current frequency the apparatus 1202 is camped on, the service acquisition module 1212 acquires the multicast service of interest to the apparatus 1202. When the frequency indicated in the USD message is not the same as the current frequency the apparatus 1202 is camped on, the service acquisition module 1212 determines that the multicast service is not available.

In a further aspect, when the apparatus 1202 is in an idle mode, the receiving module 1204 may receive a user service description (USD) message from the eNB 1250. The USD message may include at least one frequency of a multicast service of interest to the apparatus 1202. The USD message may also include service area information corresponding to the at least one frequency of the multicast service of interest to the apparatus 1202. Because the apparatus 1202 may not be equipped to read the service area information in the USD message, the receiving module 1204 may ignore the service area information and allow the apparatus 1202 to proceed with searching for a frequency to successfully acquire the multicast service without considering the service area information included in the USD message.

The frequency processing module 1206 determines whether the at least one frequency included in the USD message is a current frequency the apparatus 1202 is camped on. When the at least one frequency included in the USD message is the current frequency the apparatus 1202 is camped on, the service acquisition module 1212 proceeds to acquire the multicast service on the current frequency.

The service acquisition module 1212 determines whether the multicast service is acquired successfully. For example, the multicast service is not acquired successfully when the current frequency does not carry a temporary mobile group identifier (TMGI). If the multicast service is acquired successfully, the receiving module 1204 receives the multicast service. When the multicast service is not acquired successfully, the apparatus 1202 proceeds to begin performing a search for other frequencies for acquiring the multicast service.

When the at least one frequency included in the USD message is not the current frequency the apparatus 1202 is camped on, the UE may perform the search for other frequencies to acquire the multicast service. The search for other frequencies may begin with the system information processing module 1210 determining whether a system information message (e.g. SIB5) is received. When the system information message is not received, the service acquisition module 1212 determines that the multicast service is not available.

When the system information message is received, the frequency processing module 1206 determines which frequencies are commonly included in the USD message and the system information message. The common frequencies found in both the USD message and the system information message may be considered neighboring cell frequencies.

The apparatus 1202 may perform an operation to sequentially evaluate each of the common frequencies to successfully acquire the multicast service. Until the multicast service is successfully acquired, for an i-th common frequency, wherein i=1 to N, and wherein N is a total number of common frequencies, the cell reselection module 1208 may set a priority of the i-th common frequency to a highest priority and measure a signal strength of the i-th common frequency.

The cell reselection module 1208 performs a cell reselection determination procedure based on the signal strength of the i-th common frequency. The cell reselection determination procedure may include determining whether the i-th common frequency meets a cell reselection criterion. For example, the cell reselection criterion may be met if: 1) the i-th common frequency has the highest priority; 2) the signal strength of the i-th common frequency is greater than a threshold for a predetermined period of time; and 3) the apparatus 1202 is camped on the current cell for at least one second. Values for the threshold and the predetermined period of time may be included in the system information message (e.g., SIB5).

When the cell reselection criterion is not met, the cell reselection module 1208 may evaluate a next common frequency. For example, evaluating the next common frequency includes incrementing i and again evaluating the i-th common frequency. The cell reselection criterion is not met when: 1) the signal strength of the i-th common frequency is not above a threshold; 2) the signal strength of the i-th common frequency is not above the threshold for a predetermined period of time; or 3) the apparatus 1202 is not camped on the current cell for at least one second. When all common frequencies have been evaluated (e.g., i incremented to a maximum N), and no multicast service is successfully acquired, then the service acquisition module 1212 determines that the multicast service is not available.

When the cell reselection criterion is met, the cell reselection module 1208 performs cell reselection to a cell of the i-th common frequency. Thereafter, the service acquisition module 1212 acquires the multicast service in the cell of the i-th common frequency.

The service acquisition module 1212 determines whether the multicast service is acquired successfully. For example, the multicast service is not acquired successfully when the i-th common frequency does not carry a temporary mobile group identifier (TMGI). If the multicast service is not acquired successfully, the cell reselection module 1208 evaluates a next common frequency as described above. The receiving module 1204 receives the multicast service when the multicast service is acquired successfully.

In another aspect, when the apparatus 1202 is in a connected mode, the receiving module receives a user service description (USD) message from the eNB 1250. The USD message may include at least one frequency of a multicast service of interest to the UE.

The frequency processing module 1206 determines whether the at least one frequency included in the USD message is a current frequency the apparatus 1202 is camped on. When the at least one frequency included in the USD message is not the current frequency the apparatus 1202 is camped on, the service acquisition module 1212 determines that the multicast service is not available. When the at least one frequency included in the USD message is the current frequency the apparatus 1202 is camped on, the service acquisition module acquires the multicast service.

The service acquisition module 1212 determines whether the multicast service is acquired successfully. For example, the multicast service is not acquired successfully when the current frequency does not carry a temporary mobile group identifier (TMGI). Accordingly, when the multicast service is not acquired successfully, the service acquisition module 1212 determines that the multicast service is not available (step 1110).

The apparatus may include additional modules that perform each of the steps of the algorithm in the aforementioned flow charts of FIGS. 8-11. As such, each step in the aforementioned flow charts of FIGS. 8-11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
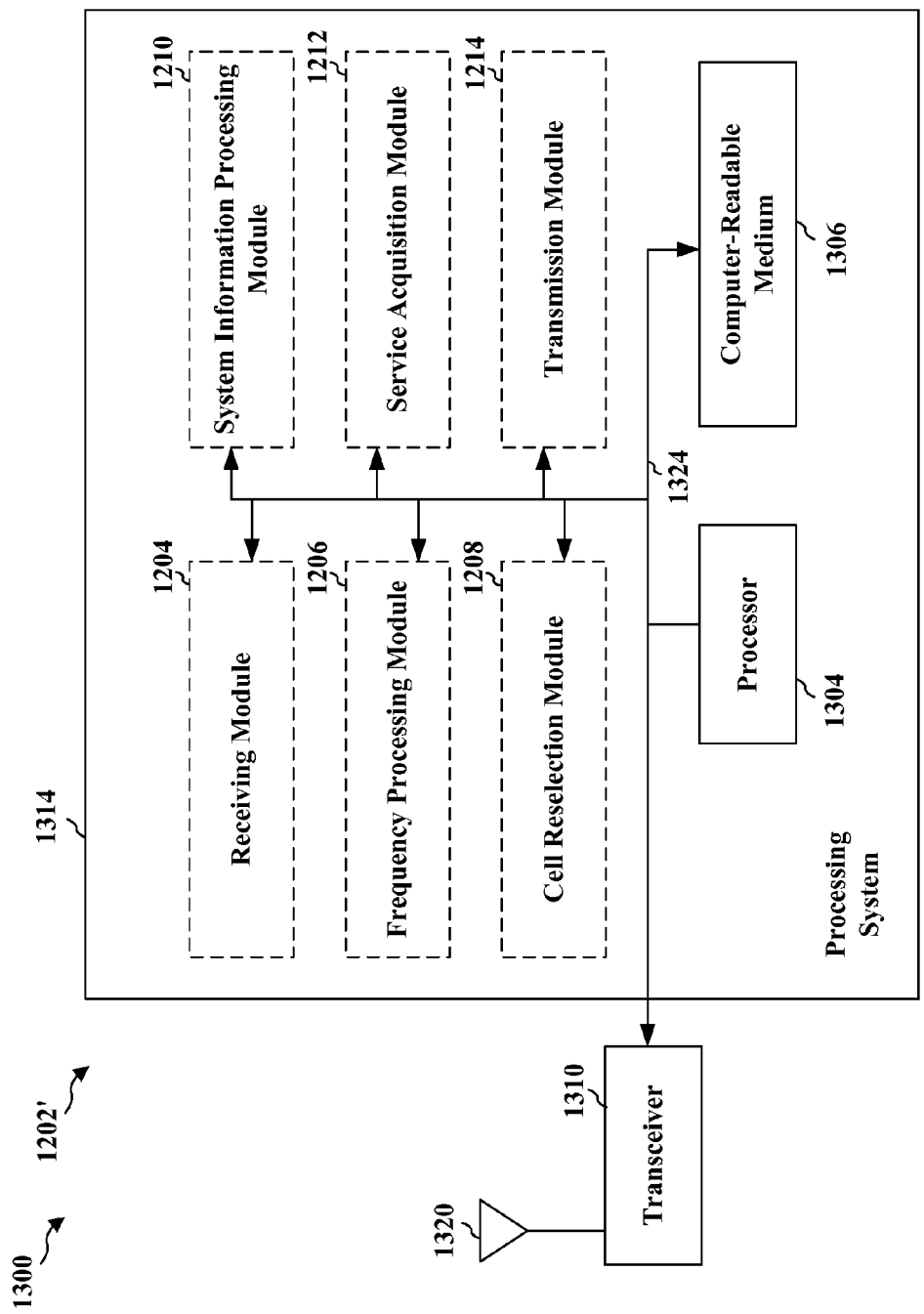
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, 1214 and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the receiving module 1204. In addition, the transceiver 1310 receives information from the processing system 1314, specifically the transmission module 1214, and based on the received information, generates a signal to be applied to the one or more antennas 1320. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, 1210, 1212, and 1214. The modules may be software modules running in the processor 1304, resident/stored in the computer readable medium 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means for receiving a user service description (USD) message, means for determining that a system information message is received, means for determining that the frequency indicated in the USD message is included in the system information message when the system information message is received, means for determining that the frequency is a neighboring cell frequency, setting a priority of the neighboring cell frequency to a highest priority, and measuring a signal strength of the neighboring cell frequency when the frequency is included in the system information message, means for performing a cell reselection determination procedure based on the signal strength of the neighboring cell frequency, means for performing cell reselection to the neighboring cell based on a result of the cell reselection determination procedure, means for acquiring the multicast service in the neighboring cell on the neighboring cell frequency, means for acquiring the multicast service when the frequency indicated in the USD message is the current frequency, means for determining that the multicast service is not available when the system information message is not received, means for determining that the multicast service is not available when the frequency indicated in the USD message is not included in the system information message, means for determining that the multicast service is not available when the result of the cell reselection procedure determines at least one of: the signal strength of the neighboring cell frequency is not above a threshold, the signal strength of the neighboring cell frequency is not above the threshold for a predetermined period of time, or the apparatus is not camped on a current cell for at least one second, means for determining that the neighboring cell frequency is a new current frequency, means for setting a priority of the new current frequency to a highest priority, means for performing cell reselection to a second neighboring cell when: the new current frequency has the highest priority, a signal strength of the new current frequency is less than a second threshold, a signal strength of the second neighboring cell is greater than a third threshold for a predetermined period of time, and the apparatus is camped on a new current cell for at least one second, means for rejecting reception of an available second multicast service on a different frequency, means for acquiring the available second multicast service based on a received acquisition instruction, means for receiving a user service description (USD) message, the USD message indicating a frequency of a multicast service of interest to the apparatus, means for acquiring the multicast service when the frequency indicated in the USD message is a current frequency, and means for determining that the multicast service is not available when the frequency indicated in the USD message is not the current frequency.

In another configuration, the apparatus 1202/1202' for wireless communication includes means for receiving a user service description (USD) message, the USD message including at least one frequency of a multicast service of interest to the apparatus, means for performing a search for other frequencies when the at least one frequency included in the USD message is not a current frequency, means for receiving the multicast service when the multicast service is acquired successfully, means for acquiring the multicast service when the at least one frequency included in the USD message is the current frequency, means for determining if the multicast service is acquired successfully, means for receiving the multicast service when the multicast service is acquired successfully, means for performing the search for other frequencies when the multicast service is not acquired successfully, wherein the USD message further includes a service area corresponding to the at least one frequency of the multicast service of interest to the apparatus, means for ignoring the service area, means for receiving a user service description (USD) message, the USD message including at least one frequency of a multicast service of interest to the apparatus, means for acquiring the multicast service when the at least one frequency included in the USD message is a current frequency, means for determining that the multicast service is not available when the multicast service is not acquired successfully, means for determining that the multicast service is not available when the at least one frequency included in the USD message is not the current frequency.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for acquiring a multicast service by a user equipment (UE), comprising:

receiving a user service description (USD) message, the USD message indicating a frequency of a multicast service of interest to the UE;

when the frequency indicated in the USD message is not a current frequency, the method further comprising:

determining that a system information message is received, determining that the frequency indicated in the USD message is included in the system information message when the system information message is received, determining that the frequency is a cell frequency of a neighboring cell, setting a priority of the frequency to a highest priority, and measuring a signal strength of the frequency when the frequency is included in the system information message, performing a cell reselection determination procedure based on the signal strength of the frequency, performing cell reselection to the neighboring cell based on a result of the cell reselection determination procedure, and acquiring the multicast service from the neighboring cell on the frequency.

2. The method of claim 1, further comprising acquiring the multicast service when the frequency indicated in the USD message is the current frequency.

3. The method of claim 1, further comprising at least one of:

determining that the multicast service is not available when the system information message is not received;

determining that the multicast service is not available when the frequency indicated in the USD message is not included in the system information message; or determining that the multicast service is not available when the result of the cell reselection procedure determines at least one of:

the signal strength of the frequency is not above a threshold, the signal strength of the frequency is not above the threshold for a predetermined period of time, or the UE is not camped on a current cell for at least one second.

4. The method of claim 1, wherein the cell reselection to the neighboring cell is performed when the result of the cell reselection determination procedure determines:

the frequency has the highest priority;

the signal strength of the frequency is greater than a threshold for a predetermined period of time; and the UE is camped on a current cell for at least one second.

5. The method of claim 4, wherein the system information message is a System Information Block Type 5 (SIB5) message, and wherein values for the threshold and the predetermined period of time are included in the SIB5 message.

6. The method of claim 1, wherein the multicast service from the neighboring cell on the frequency is acquired, the method further comprising:

determining that the frequency is a new current frequency;

setting a priority of the new current frequency to a highest priority; and performing cell reselection to a second neighboring cell when:

the new current frequency has the highest priority, a signal strength of the new current frequency is less than a second threshold, a signal strength of the second neighboring cell is greater than a third threshold for a predetermined period of time, and the UE is camped on a new current cell for at least one second.

7. The method of claim 6, wherein the system information message is at least one of a System Information Block Type 3 (SIB3) message or a System Information Block Type 5 (SIB5) message, and
wherein a value for the second threshold is included in the SIB3 message, and values for the third threshold and the predetermined period of time are included in the SIB5 message.

8. The method of claim 1, wherein the multicast service from the neighboring cell on the frequency is acquired, the method further comprising one of:
rejecting reception of an available second multicast service on a different frequency; or
acquiring the available second multicast service based on a received acquisition instruction, the acquiring the available second multicast service comprising:
deactivating a current multicast service,
setting a priority of the different frequency to a highest priority, and
performing cell reselection to a cell of the different frequency to acquire the available second multicast service when:
the different frequency has the highest priority;
a signal strength of the cell of the different frequency is greater than a threshold for a predetermined period of time; and
the UE is camped on a current cell for at least one second.

9. A method for acquiring a multicast service by a user equipment (UE), comprising:
receiving a user service description (USD) message, the USD message indicating a frequency of a multicast service of interest to the UE;
acquiring the multicast service when the frequency indicated in the USD message is a current frequency; and
determining that the multicast service is not available when the frequency indicated in the USD message is not the current frequency.

10. A method for acquiring a multicast service by a user equipment (UE), comprising:
receiving a user service description (USD) message, the USD message including at least one frequency of a multicast service of interest to the UE;
performing a search for other frequencies when the at least one frequency included in the USD message is not a current frequency, the search for other frequencies comprising:
determining that a system information message is received,
determining frequencies commonly included in the USD message and the system information message when the system information is received,
determining that the common frequencies are neighboring cell frequencies,
for an i-th common frequency, i=1 to N, wherein N is a total number of common frequencies, and until the multicast service is acquired successfully, the search for other frequencies further comprising:
setting a priority of the i-th common frequency to a highest priority,
measuring a signal strength of the i-th common frequency,
performing a cell reselection determination procedure based on the signal strength of the i-th common frequency,
performing cell reselection to a cell of the i-th common frequency based on a result of the cell reselection determination procedure,
acquiring the multicast service in the cell of the i-th common frequency when the cell reselection is performed, and
determining if the multicast service is acquired successfully; and
receiving the multicast service when the multicast service is acquired successfully.

11. The method of claim 10, further comprising:
acquiring the multicast service when the at least one frequency included in the USD message is the current frequency;
determining if the multicast service is acquired successfully;
receiving the multicast service when the multicast service is acquired successfully; and
performing the search for other frequencies when the multicast service is not acquired successfully.

12. The method of claim 10, wherein the search for other frequencies further comprises at least one of:
determining that the multicast service is not available when the system information message is not received;
incrementing i when the result of the cell reselection determination procedure determines at least one of:
the signal strength of the i-th common frequency is not above a threshold,
the signal strength of the i-th common frequency is not above the threshold for a predetermined period of time, or
the UE is not camped on a current cell for at least one second;
incrementing i when the multicast service is not acquired successfully; and
determining that the multicast service is not available when the multicast service is not acquired successfully after i has been incremented to a maximum N.

13. The method of claim 10, wherein the cell reselection to the cell of the i-th common frequency is performed when the result of the cell reselection determination procedure determines:
the i-th common frequency has the highest priority;
the signal strength of the i-th common frequency is greater than a threshold for a predetermined period of time; and
the UE is camped on a current cell for at least one second.

14. The method of claim 13, wherein the system information message is a System Information Block Type 5 (SIB5) message, and
wherein values for the threshold and the predetermined period of time are included in the SIB5 message.

15. The method of claim 10, wherein the multicast service is not acquired successfully when the i-th common frequency does not carry a temporary mobile group identifier (TMGI).

16. The method of claim 10, wherein the USD message further includes a service area corresponding to the at least one frequency of the multicast service of interest to the UE, the method further comprising:
ignoring the service area; and
performing the search for other frequencies based on the at least one frequency without considering the service area included in the USD message.

17. A method for acquiring a multicast service by a user equipment (UE), comprising:
receiving a user service description (USD) message, the USD message including at least one frequency of a multicast service of interest to the UE;

acquiring the multicast service when the at least one frequency included in the USD message is a current frequency;

determining that the multicast service is not available when the multicast service is not acquired successfully; and determining that the multicast service is not available when the at least one frequency included in the USD message is not the current frequency.

18. The method of claim 17, wherein the multicast service is not acquired successfully when the current frequency does not carry a temporary mobile group identifier (TMGI).

19. An apparatus for acquiring a multicast service, comprising:

means for receiving a user service description (USD) message, the USD message indicating a frequency of a multicast service of interest to the apparatus;

wherein the frequency indicated in the USD message is not a current frequency, the apparatus further comprising:

means for determining that a system information message is received, means for determining that the frequency indicated in the USD message is included in the system information message when the system information message is received, means for determining that the frequency is a cell frequency of a neighboring cell, setting a priority of the frequency to a highest priority, and measuring a signal strength of the frequency when the frequency is included in the system information message, means for performing a cell reselection determination procedure based on the signal strength of the frequency, means for performing cell reselection to the neighboring cell based on a result of the cell reselection determination procedure, and means for acquiring the multicast service from the neighboring cell on the frequency.

20. The apparatus of claim 19, further comprising means for acquiring the multicast service when the frequency indicated in the USD message is the current frequency.

21. The apparatus of claim 19, further comprising at least one of:

means for determining that the multicast service is not available when the system information message is not received;

means for determining that the multicast service is not available when the frequency indicated in the USD message is not included in the system information message; or means for determining that the multicast service is not available when the result of the cell reselection procedure determines at least one of:

the signal strength of the frequency is not above a threshold, the signal strength of the frequency is not above the threshold for a predetermined period of time, or the apparatus is not camped on a current cell for at least one second.

22. The apparatus of claim 19, wherein the cell reselection to the neighboring cell is performed when the result of the cell reselection determination procedure determines:

the frequency has the highest priority;

the signal strength of the frequency is greater than a threshold for a predetermined period of time; and the apparatus is camped on a current cell for at least one second.

23. The apparatus of claim 22, wherein the system information message is a System Information Block Type (SIB) 5 message, and wherein values for the threshold and the predetermined period of time are included in the SIB5 message.

24. The apparatus of claim 19, wherein the multicast service from the neighboring cell on the frequency is acquired, the apparatus further comprising:

means for determining that the frequency is a new current frequency;

means for setting a priority of the new current frequency to a highest priority; and means for performing cell reselection to a second neighboring cell when:

the new current frequency has the highest priority, a signal strength of the new current frequency is less than a second threshold, a signal strength of the second neighboring cell is greater than a third threshold for a predetermined period of time, and the apparatus is camped on a new current cell for at least one second.

25. The apparatus of claim 24, wherein the system information message is at least one of a System Information Block Type 3 (SIB3) message or a System Information Block Type 5 (SIB5) message, and wherein a value for the second threshold is included in the SIB3 message, and values for the third threshold and the predetermined period of time are included in the SIB5 message.

26. The apparatus of claim 19, wherein the multicast service from the neighboring cell on the frequency is acquired, the apparatus further comprising one of:

means for rejecting reception of an available second multicast service on a different frequency; or means for acquiring the available second multicast service based on a received acquisition instruction, the means for acquiring the available second multicast service configured to:

deactivate a current multicast service, set a priority of the different frequency to a highest priority, and perform cell reselection to a cell of the different frequency to acquire the available second multicast service when:

the different frequency has the highest priority;

a signal strength of the cell of the different frequency is greater than a threshold for a predetermined period of time; and the apparatus is camped on a current cell for at least one second.

27. An apparatus for acquiring a multicast service, comprising:

means for receiving a user service description (USD) message, the USD message indicating a frequency of a multicast service of interest to the apparatus;

means for acquiring the multicast service when the frequency indicated in the USD message is a current frequency; and means for determining that the multicast service is not available when the frequency indicated in the USD message is not the current frequency.

28. An apparatus for acquiring a multicast service, comprising:

means for receiving a user service description (USD) message, the USD message including at least one frequency of a multicast service of interest to the apparatus;

means for performing a search for other frequencies when the at least one frequency included in the USD message is not a current frequency, the means for performing the search for other frequencies configured to:
- determine that a system information message is received,
- determine frequencies commonly included in the USD message and the system information message when the system information is received,
- determine that the common frequencies are neighboring cell frequencies,
- for an i-th common frequency, i=1 to N, wherein N is a total number of common frequencies, and until the multicast service is acquired successfully, the means for performing the search for other frequencies further configured to:
  - set a priority of the i-th common frequency to a highest priority,
  - measure a signal strength of the i-th common frequency,
  - perform a cell reselection determination procedure based on the signal strength of the i-th common frequency,
  - perform cell reselection to a cell of the i-th common frequency based on a result of the cell reselection determination procedure,
  - acquire the multicast service in the cell of the i-th common frequency when the cell reselection is performed, and
  - determine if the multicast service is acquired successfully; and means for receiving the multicast service when the multicast service is acquired successfully.

29. The apparatus of claim 28, further comprising:
means for acquiring the multicast service when the at least one frequency included in the USD message is the current frequency;
means for determining if the multicast service is acquired successfully;
means for receiving the multicast service when the multicast service is acquired successfully; and
means for performing the search for other frequencies when the multicast service is not acquired successfully.

30. The apparatus of claim 28, wherein the means for performing the search for other frequencies is further configured to at least one of:
- determine that the multicast service is not available when the system information message is not received;
- increment i when the result of the cell reselection determination procedure determines at least one of:
  - the signal strength of the i-th common frequency is not above a threshold,
  - the signal strength of the i-th common frequency is not above the threshold for a predetermined period of time, or
  - the UE is not camped on a current cell for at least one second;
- increment i when the multicast service is not acquired successfully; and
- determine that the multicast service is not available when the multicast service is not acquired successfully after i has been incremented to a maximum N.

31. The apparatus of claim 28, wherein the cell reselection to the cell of the i-th common frequency is performed when the result of the cell reselection determination procedure determines:

the i-th common frequency has the highest priority;
the signal strength of the i-th common frequency is greater than a threshold for a predetermined period of time; and
the apparatus is camped on a current cell for at least one second.

32. The apparatus of claim 31, wherein the system information message is a System Information Block Type 5 (SIB5) message, and
wherein values for the threshold and the predetermined period of time are included in the SIB5 message.

33. The apparatus of claim 28, wherein the multicast service is not acquired successfully when the i-th common frequency does not carry a temporary mobile group identifier (TMGI).

34. The apparatus of claim 28, wherein the USD message further includes a service area corresponding to the at least one frequency of the multicast service of interest to the apparatus, the apparatus further comprising:
means for ignoring the service area, and
wherein the means for performing the search for other frequencies is configured to perform the search based on the at least one frequency without considering the service area included in the USD message.

35. An apparatus for acquiring a multicast service, comprising:
means for receiving a user service description (USD) message, the USD message including at least one frequency of a multicast service of interest to the apparatus;
means for acquiring the multicast service when the at least one frequency included in the USD message is a current frequency;
means for determining that the multicast service is not available when the multicast service is not acquired successfully; and
means for determining that the multicast service is not available when the at least one frequency included in the USD message is not the current frequency.

36. The apparatus of claim 35, wherein the multicast service is not acquired successfully when the current frequency does not carry a temporary mobile group identifier (TMGI).

37. An apparatus for acquiring a multicast service, comprising:
a processing system configured to:
receive a user service description (USD) message, the USD message indicating a frequency of a multicast service of interest to the apparatus;
wherein the frequency indicated in the USD message is not a current frequency, the processing system further configured to:
- determine that a system information message is received,
- determine that the frequency indicated in the USD message is included in the system information message when the system information message is received,
- determine that the frequency is a cell frequency of a neighboring cell, set a priority of the frequency to a highest priority, and measure a signal strength of the frequency when the frequency is included in the system information message,
- perform a cell reselection determination procedure based on the signal strength of the frequency,
- perform cell reselection to the neighboring cell based on a result of the cell reselection determination procedure, and
- acquire the multicast service from the neighboring cell on the frequency.

38. The apparatus of claim 37, the processing system further configured to acquire the multicast service when the frequency indicated in the USD message is the current frequency.

39. The apparatus of claim 37, the processing system further configured to at least one of:
   determine that the multicast service is not available when the system information message is not received;
   determine that the multicast service is not available when the frequency indicated in the USD message is not included in the system information message; or
   determine that the multicast service is not available when the result of the cell reselection procedure determines at least one of:
      the signal strength of the frequency is not above a threshold,
      the signal strength of the frequency is not above the threshold for a predetermined period of time, or
      the apparatus is not camped on a current cell for at least one second.

40. The apparatus of claim 37, wherein the cell reselection to the neighboring cell is performed when the result of the cell reselection determination procedure determines:
   the frequency has the highest priority;
   the signal strength of the frequency is greater than a threshold for a predetermined period of time; and
   the apparatus is camped on a current cell for at least one second.

41. The apparatus of claim 40, wherein the system information message is a System Information Block Type 5 (SIB5) message, and
   wherein values for the threshold and the predetermined period of time are included in the SIB5 message.

42. The apparatus of claim 37, wherein the multicast service from the neighboring cell on the frequency is acquired, the processing system further configured to:
   determine that the frequency is a new current frequency;
   set a priority of the new current frequency to a highest priority; and
   perform cell reselection to a second neighboring cell when:
      the new current frequency has the highest priority,
      a signal strength of the new current frequency is less than a second threshold,
      a signal strength of the second neighboring cell is greater than a third threshold for a predetermined period of time, and
      the apparatus is camped on a new current cell for at least one second.

43. The apparatus of claim 42, wherein the system information message is at least one of a System Information Block Type 3 (SIB3) message or a System Information Block Type 5 (SIB5) message, and
   wherein a value for the second threshold is included in the SIB3 message, and values for the third threshold and the predetermined period of time are included in the SIB5 message.

44. The apparatus of claim 37, wherein the multicast service from the neighboring cell on the frequency is acquired, the processing system further configured to one of:
   reject reception of an available second multicast service on a different frequency; or
   acquire the available second multicast service based on a received acquisition instruction, the processing system configured to acquire the available second multicast service further configured to:
      deactivate a current multicast service,
      set a priority of the different frequency to a highest priority, and
      perform cell reselection to a cell of the different frequency to acquire the available second multicast service when:
         the different frequency has the highest priority;
         a signal strength of the cell of the different frequency is greater than a threshold for a predetermined period of time; and
         the apparatus is camped on a current cell for at least one second.

45. An apparatus for acquiring a multicast service, comprising:
   a processing system configured to:
   receive a user service description (USD) message, the USD message indicating a frequency of a multicast service of interest to the apparatus;
   acquire the multicast service when the frequency indicated in the USD message is a current frequency; and
   determine that the multicast service is not available when the frequency indicated in the USD message is not the current frequency.

46. An apparatus for acquiring a multicast service, comprising:
   a processing system configured to:
   receive a user service description (USD) message, the USD message including at least one frequency of a multicast service of interest to the apparatus;
   perform a search for other frequencies when the at least one frequency included in the USD message is not a current frequency, the processing system configured to search for other frequencies further configured to:
      determine that a system information message is received,
      determine frequencies commonly included in the USD message and the system information message when the system information is received,
      determine that the common frequencies are neighboring cell frequencies,
      for an i-th common frequency, i=1 to N, wherein N is a total number of common frequencies, and until the multicast service is acquired successfully, the processing system configured to search for other frequencies further configured to:
         set a priority of the i-th common frequency to a highest priority,
         measure a signal strength of the i-th common frequency,
         perform a cell reselection determination procedure based on the signal strength of the i-th common frequency,
         perform cell reselection to a cell of the i-th common frequency based on a result of the cell reselection determination procedure,
         acquire the multicast service in the cell of the i-th common frequency when the cell reselection is performed, and
         determine if the multicast service is acquired successfully; and
      receive the multicast service when the multicast service is acquired successfully.

47. The apparatus of claim 46, the processing system further configured to:
   acquire the multicast service when the at least one frequency included in the USD message is the current frequency;
   determine if the multicast service is acquired successfully;

receive the multicast service when the multicast service is acquired successfully; and perform the search for other frequencies when the multicast service is not acquired successfully.

48. The apparatus of claim 46, wherein the processing system configured to search for other frequencies is further configured to at least one of:

determine that the multicast service is not available when the system information message is not received;

increment i when the result of the cell reselection determination procedure determines at least one of:

the signal strength of the i-th common frequency is not above a threshold, the signal strength of the i-th common frequency is not above the threshold for a predetermined period of time, or the apparatus is not camped on a current cell for at least one second;

increment i when the multicast service is not acquired successfully; and determine that the multicast service is not available when the multicast service is not acquired successfully after i has been incremented to a maximum N.

49. The apparatus of claim 46, wherein the cell reselection to the cell of the i-th common frequency is performed when the result of the cell reselection determination procedure determines:

the i-th common frequency has the highest priority;

the signal strength of the i-th common frequency is greater than a threshold for a predetermined period of time; and the apparatus is camped on a current cell for at least one second.

50. The apparatus of claim 49, wherein the system information message is a System Information Block Type 5 (SIB5) message, and wherein values for the threshold and the predetermined period of time are included in the SIB5 message.

51. The apparatus of claim 46, wherein the multicast service is not acquired successfully when the i-th common frequency does not carry a temporary mobile group identifier (TMGI).

52. The apparatus of claim 46, wherein the USD message further includes a service area corresponding to the at least one frequency of the multicast service of interest to the apparatus, the processing system further configured to:

ignore the service area; and perform the search for other frequencies based on the at least one frequency without considering the service area included in the USD message.

53. An apparatus for acquiring a multicast service, comprising:

a processing system configured to:

receive a user service description (USD) message, the USD message including at least one frequency of a multicast service of interest to the apparatus;

acquire the multicast service when the at least one frequency included in the USD message is a current frequency;

determine that the multicast service is not available when the multicast service is not acquired successfully; and determine that the multicast service is not available when the at least one frequency included in the USD message is not the current frequency.

54. The apparatus of claim 53, wherein the multicast service is not acquired successfully when the current frequency does not carry a temporary mobile group identifier (TMGI).

55. A non-transitory computer-readable medium for acquiring a multicast service by a user equipment (UE), comprising code for:

receiving a user service description (USD) message, the USD message indicating a frequency of a multicast service of interest to the UE;

wherein the frequency indicated in the USD message is not a current frequency, the non-transitory computer-readable medium further comprising code for:

determining that a system information message is received, determining that the frequency indicated in the USD message is included in the system information message when the system information message is received, determining that the frequency is a cell frequency of a neighboring cell, setting a priority of the frequency to a highest priority, and measuring a signal strength of the frequency when the frequency is included in the system information message, performing a cell reselection determination procedure based on the signal strength of the frequency, performing cell reselection to the neighboring cell based on a result of the cell reselection determination procedure, and acquiring the multicast service from the neighboring cell on the frequency.

56. A non-transitory computer-readable medium for acquiring a multicast service by a user equipment (UE), comprising code for:

receiving a user service description (USD) message, the USD message indicating a frequency of a multicast service of interest to the UE;

acquiring the multicast service when the frequency indicated in the USD message is a current frequency; and determining that the multicast service is not available when the frequency indicated in the USD message is not the current frequency.

57. A non-transitory computer-readable medium for acquiring a multicast service by a user equipment (UE), comprising code for:

receiving a user service description (USD) message, the USD message including at least one frequency of a multicast service of interest to the UE;

performing a search for other frequencies when the at least one frequency included in the USD message is not a current frequency, the code for performing the search for other frequencies configured to:

determine that a system information message is received, determine frequencies commonly included in the USD message and the system information message when the system information is received, determine that the common frequencies are neighboring cell frequencies, for an i-th common frequency, i=1 to N, wherein N is a total number of common frequencies, and until the multicast service is acquired successfully, the code for performing the search for other frequencies further configured to:

set a priority of the i-th common frequency to a highest priority, measure a signal strength of the i-th common frequency, perform a cell reselection determination procedure based on the signal strength of the i-th common frequency, perform cell reselection to a cell of the i-th common frequency based on a result of the cell reselection determination procedure, acquire the multicast service in the cell of the i-th common frequency when the cell reselection is performed, and determine if the multicast service is acquired successfully; and receiving the multicast service when the multicast service is acquired successfully.

58. A non-transitory computer-readable medium for acquiring a multicast service by a user equipment (UE), comprising code for:

receiving a user service description (USD) message, the USD message including at least one frequency of a multicast service of interest to the UE;

acquiring the multicast service when the at least one frequency included in the USD message is a current frequency;

determining that the multicast service is not available when the multicast service is not acquired successfully; and determining that the multicast service is not available when the at least one frequency included in the USD message is not the current frequency.

* * * * *